United States Patent
Oguro et al.

(10) Patent No.: US 10,967,864 B2
(45) Date of Patent: Apr. 6, 2021

(54) VEHICLE CONTROL DEVICE

(71) Applicant: HONDA MOTOR CO., LTD., Tokyo (JP)

(72) Inventors: Hiroshi Oguro, Wako (JP); Daichi Kato, Wako (JP); Chihiro Abe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 16/338,775

(22) PCT Filed: Oct. 3, 2016

(86) PCT No.: PCT/JP2016/079243
§ 371 (c)(1),
(2) Date: Apr. 2, 2019

(87) PCT Pub. No.: WO2018/066024
PCT Pub. Date: Apr. 12, 2018

(65) Prior Publication Data
US 2020/0114916 A1  Apr. 16, 2020

(51) Int. Cl.
*B60W 30/18* (2012.01)
*B60W 30/16* (2020.01)
*G05D 1/02* (2020.01)

(52) U.S. Cl.
CPC .... *B60W 30/18018* (2013.01); *B60W 30/162* (2013.01); *B60W 30/181* (2013.01); *G05D 1/0217* (2013.01); *G05D 1/0223* (2013.01)

(58) Field of Classification Search
CPC ......... B60W 30/18018; B60W 30/162; B60W 30/181; G05D 1/0217; G05D 1/0223

USPC ......................................................... 701/70
See application file for complete search history.

(56) References Cited

U.S. PATENT DOCUMENTS

2009/0265070 A1* 10/2009 Okada ............... B60W 50/0098
                                                        701/70
2010/0004839 A1*  1/2010 Yokoyama ............. G08G 1/052
                                                        701/70
2013/0253750 A1*  9/2013 Otake ............. B60W 30/18127
                                                        701/22

(Continued)

FOREIGN PATENT DOCUMENTS

JP       4646990 B2      3/2011
JP     2011-073664 A     4/2011

(Continued)

OTHER PUBLICATIONS

PCT/ISA/210 from International Application PCT/JP2016/079243 with the English translation thereof.

*Primary Examiner* — Krishnan Ramesh
(74) *Attorney, Agent, or Firm* — Carrier Blackman & Associates, P.C.; Joseph P. Carrier; Jeffrey T. Gedeon

(57) ABSTRACT

This vehicle control device is provided with: an external sensor which detects a vehicle stop position present ahead of a host vehicle in the travel direction; and a remaining distance calculation unit which calculates the remaining distance to the detected vehicle stop position from the host vehicle. The vehicle control device is further provided with a medium-term trajectory generation unit and a short-term trajectory generation unit which use a predefined setting method to set a target speed for decelerating the host vehicle in accordance with the calculated remaining distance.

6 Claims, 14 Drawing Sheets

(56) References Cited

U.S. PATENT DOCUMENTS

| | | | |
|---|---|---|---|
| 2014/0303868 A1* | 10/2014 | Otake | B60W 30/18109 701/70 |
| 2018/0022350 A1* | 1/2018 | McNew | G05D 1/0223 701/23 |
| 2020/0050210 A1* | 2/2020 | Lin | B60W 30/162 |

FOREIGN PATENT DOCUMENTS

| | | |
|---|---|---|
| JP | 2012-148699 A | 8/2012 |
| JP | 2016-136305 A | 7/2016 |

* cited by examiner

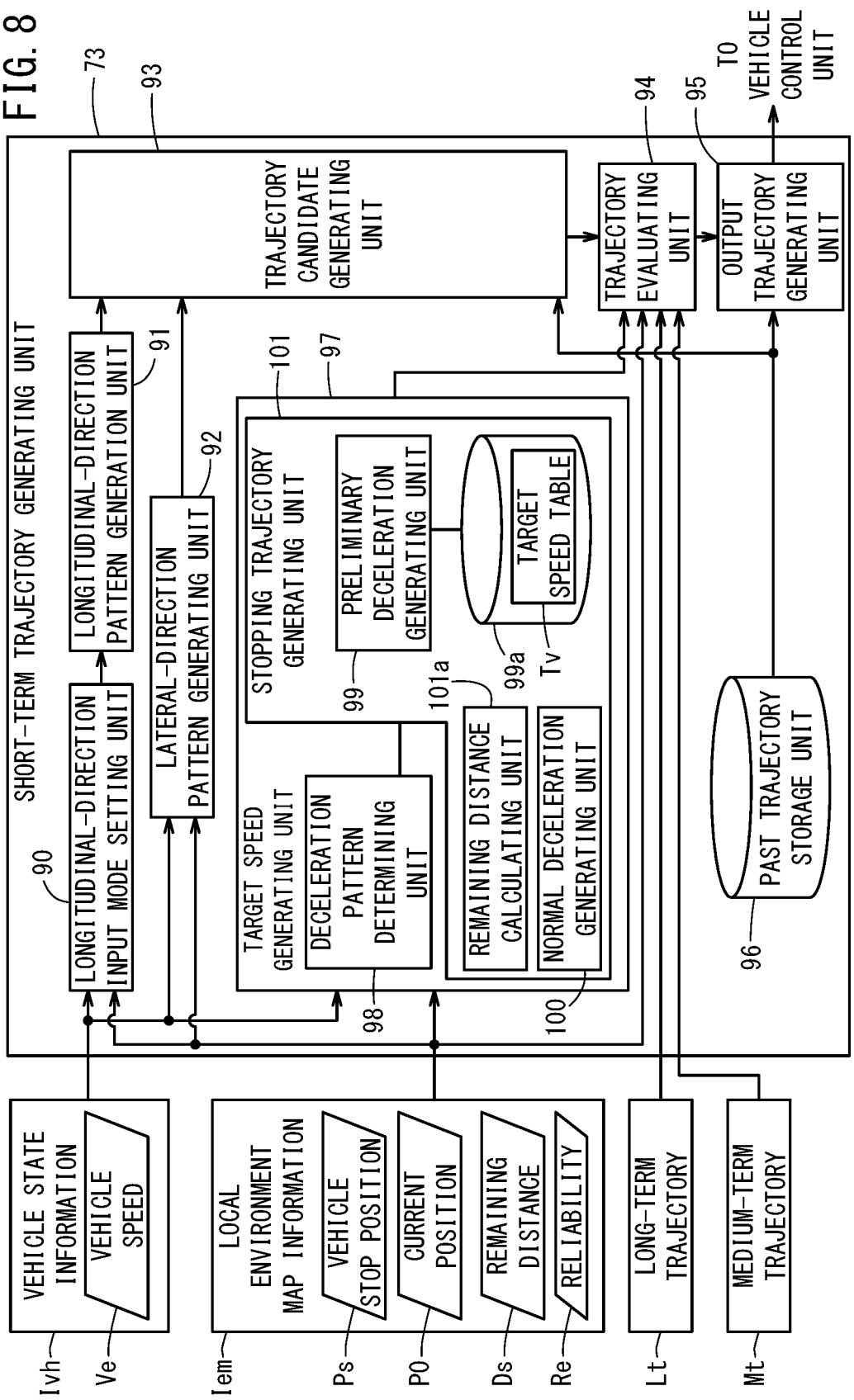

FIG. 14A

| VEHICLE STOP POSITION TARGET OBJECT | CORRECTION DETERMINATION |
|---|---|
| SIGNAL STOP LINE | IMPLEMENT |
| TEMPORARY STOP LINE | IMPLEMENT |
| VEHICLE IN FRONT | DO NOT IMPLEMENT |
| ⋮ | ⋮ |

FIG. 14B

| RELIABILITY | LOW | HIGH |
|---|---|---|
| CORRECTION DETERMINATION | DO NOT IMPLEMENT | IMPLEMENT |

VEHICLE CONTROL DEVICE

TECHNICAL FIELD

The present invention relates to a vehicle control device that performs automated driving or assisted driving of a vehicle.

BACKGROUND ART

As disclosed in Japanese Patent No. 4646990, a vehicle control device that performs automated driving or assisted driving of a vehicle (host vehicle) detects a vehicle stop position and performs stopping control to decelerate and stop the host vehicle at this vehicle stop position.

However, the vehicle stop position detected by a camera or the like of the host vehicle can include detection errors due to the camera having poor recognition, missing a stop line, or the like. In particular, when the host vehicle is far from the vehicle stop position, the ability to identify the position (reliability of the information) drops and the errors become large. Furthermore, even when the vehicle stop position is acquired from detection results of the host vehicle location and map information of a navigation apparatus or the like, detection errors and calculation errors occur.

Therefore, at the point where it is possible to accurately recognize the vehicle stop position, the host vehicle is relatively close to the vehicle stop position, and if the velocity of the host vehicle is high at this point, the host vehicle cannot stop at the vehicle stop position or requires sudden braking. In other words, there is a desire for the stop control to stop the host vehicle more stably and comfortably at the vehicle stop position.

SUMMARY OF INVENTION

The present invention takes the above factors into consideration, and it is an objective of the present invention to provide a vehicle control device capable of more safely and effectively stopping a host vehicle at a vehicle stop position by setting a target speed at every remaining distance to the vehicle stop position.

To achieve this objective, a vehicle control device according to the present invention comprises a vehicle stop position detecting unit configured to detect a vehicle stop position in front of a host vehicle in a traveling direction thereof; a remaining distance calculating unit configured to calculate a remaining distance from the host vehicle to the detected vehicle stop position; and a target speed setting unit configured to set a target speed for decelerating the host vehicle according to the calculated remaining distance, using a predetermined setting method.

According to the above, by having the target speed setting unit set the target speed according to the remaining distance using the predetermined setting method, when the stopping control is performed, it is possible to decelerate the host vehicle to follow the target speed corresponding to the remaining distance, regardless of the detection state of the vehicle stop position. Accordingly, at the point where the vehicle stop position is accurately detected, the speed of the host vehicle has already decreased sufficiently, and the vehicle control device can stop the host vehicle at the vehicle stop position Ps stably and comfortably.

In this case, it is preferable that the vehicle control device comprises a vehicle speed detecting unit configured to detect a vehicle speed of the host vehicle; and a reliability determining unit configured to determine whether the vehicle stop position detected by the vehicle stop position detecting unit or information concerning the remaining distance calculated by the remaining distance calculating unit is reliable, wherein the target speed setting unit includes a preliminary deceleration setting unit configured to set a target speed corresponding to the remaining distance using the setting method when it is determined that the information is not reliable, and a normal deceleration setting unit configured to set a target speed that changes in finer increments than the target speed set by the preliminary deceleration setting unit, based on the remaining distance and the vehicle speed, when it is determined that the information is reliable.

In this way, the target speed setting unit can perform preliminary deceleration to set a target speed according to the remaining distance using the preliminary deceleration setting unit when the information concerning the vehicle stop position or the remaining distance is unreliable. Accordingly, at the point when the information concerning the vehicle stop position or the remaining distance becomes reliable, the normal deceleration setting unit can set the target speed to be finer, i.e. smoother over time, than the target speed set by the preliminary deceleration setting unit based on the vehicle speed that has been somewhat lowered, and can stop the host vehicle more comfortably.

It is preferable that, in addition to the above configuration, the preliminary deceleration setting unit is configured to prompt deceleration of the host vehicle by outputting the target speed when the vehicle speed is higher than the target speed, and does not prompt acceleration of the host vehicle when the vehicle speed is lower than or equal to the target speed.

In this way, when the detected vehicle speed is less than or equal to the target speed, it is possible to prevent a decrease in the travel efficiency of the host vehicle, fuel consumption, comfort of the vehicle occupants, and the like by prompting acceleration of the host vehicle.

Furthermore, the reliability determining unit may be configured to determine whether the information is reliable based on a reliability quantified as information concerning the vehicle stop position or the remaining distance, and the reliability may be set for each of a plurality of types of apparatuses forming the vehicle stop position detecting unit.

In this way, it is possible to provide a suitable reliability for the information detected by each apparatus, based on the type of apparatus, and to favorably select the operation of the preliminary deceleration setting unit and the normal deceleration setting unit based on this reliability.

Furthermore, the reliability determining unit may be configured to determine whether the information is reliable based on a reliability quantified as information concerning the vehicle stop position or the remaining distance, and the reliability may be set according to factors of the host vehicle itself or factors outside the host vehicle that affect the reliability by processing detection information detected by the vehicle stop position detecting unit.

In this way, the vehicle control device can provide a suitable reliability to the information concerning the vehicle stop position or the remaining distance, based on factors outside the host vehicle or factors of the host vehicle itself.

Here, it is preferable that the vehicle control device comprises a storage unit configured to store a target speed table in which the target speed decreases in a stepped manner as the remaining distance becomes shorter, wherein the target speed setting unit is configured to reference the target speed table and set the target speed corresponding to the remaining distance, as the predetermined setting method.

In this way, the target speed setting unit can easily set the target speed corresponding to the remaining distance by referencing the target speed table stored in the storage unit. Furthermore, even when an error is contained in the vehicle stop position, it is possible to set the target speed with a tolerance to absorb the error by setting the target speed in a stepped manner in the target speed table.

The target speed table may divide the remaining distance into a plurality of predetermined ranges, and the target speed decreases uniformly as the remaining distance in each predetermined range becomes shorter.

In this way, the vehicle control device can smoothly decelerate the host vehicle by using the target speed table in which the target speed decreases uniformly as each predetermined region becomes smaller.

As described above, the vehicle control device according to the present invention can more stably and comfortably stop the host vehicle at the vehicle stop point by setting the target speed for each remaining distance to the vehicle stop point.

BRIEF DESCRIPTION OF DRAWINGS

FIG. 8 is a block diagram shows a configuration of a short-term trajectory generating unit when the stopping control is performed;

FIG. 14A is a descriptive diagram showing an example of implementing or not implementing the change of the deceleration mode based on a target object at the vehicle stop position, and FIG. 14B is a descriptive diagram showing an example of implementing or not implementing the change of the deceleration mode based on the reliability of the external environment recognition information.

DESCRIPTION OF EMBODIMENTS

The following is a detailed description of a vehicle control device according to the present invention, provided as a preferred embodiment, with reference to the attached drawings.

Figure 1:
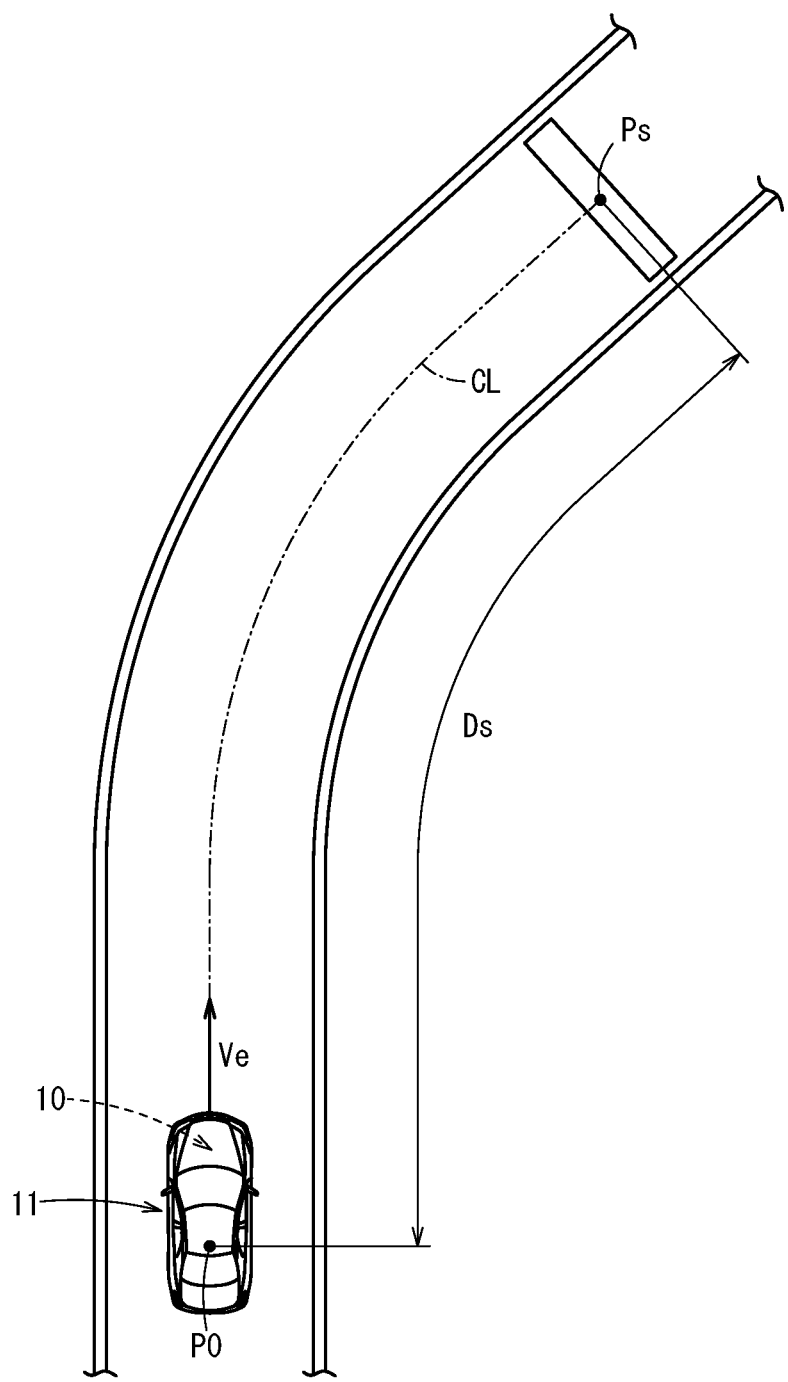
FIG. 1 is a planar view for describing the operation of stopping a vehicle, in which is mounted a vehicle control device according, at a vehicle stop position, according an embodiment of the present invention.

As shown in FIG. 1, a vehicle control device 10 according to an embodiment of the present invention is mounted in a vehicle 11 (also referred to as a host vehicle 11 below), and controls automated driving of the host vehicle 11. With the automated driving, velocity control for adjusting the velocity of the host vehicle 11 (acceleration, deceleration, maintaining velocity, and the like) and steering angle control for adjusting the traveling direction of the host vehicle 11 are performed integrally.

The vehicle control device 10 detects a vehicle stop position Ps located in front of the host vehicle 11 in the traveling direction, and performs stopping control to decelerate and stop the host vehicle 11 at this vehicle stop position Ps. In particular, the vehicle control device 10 is configured to safely stop the host vehicle 11 at the vehicle stop position Ps by preemptively decelerating the host vehicle 11 if the velocity of the host vehicle 11 is high, even if the detection of the vehicle stop position Ps is insufficient, and to reduce the acceleration applied to a vehicle occupant as much as possible depending on the situation.

The "vehicle stop position Ps" is a target position in a travel route for stopping set by the host vehicle 11 for safety. For example, the vehicle stop position Ps is set by having the vehicle control device 10 detect a stop line, traffic signal (a signal stop line or a traffic light stop line), sign, crossing, construction point, guidance light, or the like and determine whether this is a target where the host vehicle 11 is to be stopped. Furthermore, the vehicle stop position Ps may be set for traffic participants such as an obstruction (including a parked vehicle), another vehicle, or a person that are located in front of the host vehicle 11 in the traveling direction. In the following, a stop line in a road is described as a representative example of the vehicle stop position Ps.

[Overall Configuration of the Host Vehicle 11]

Figure 2:
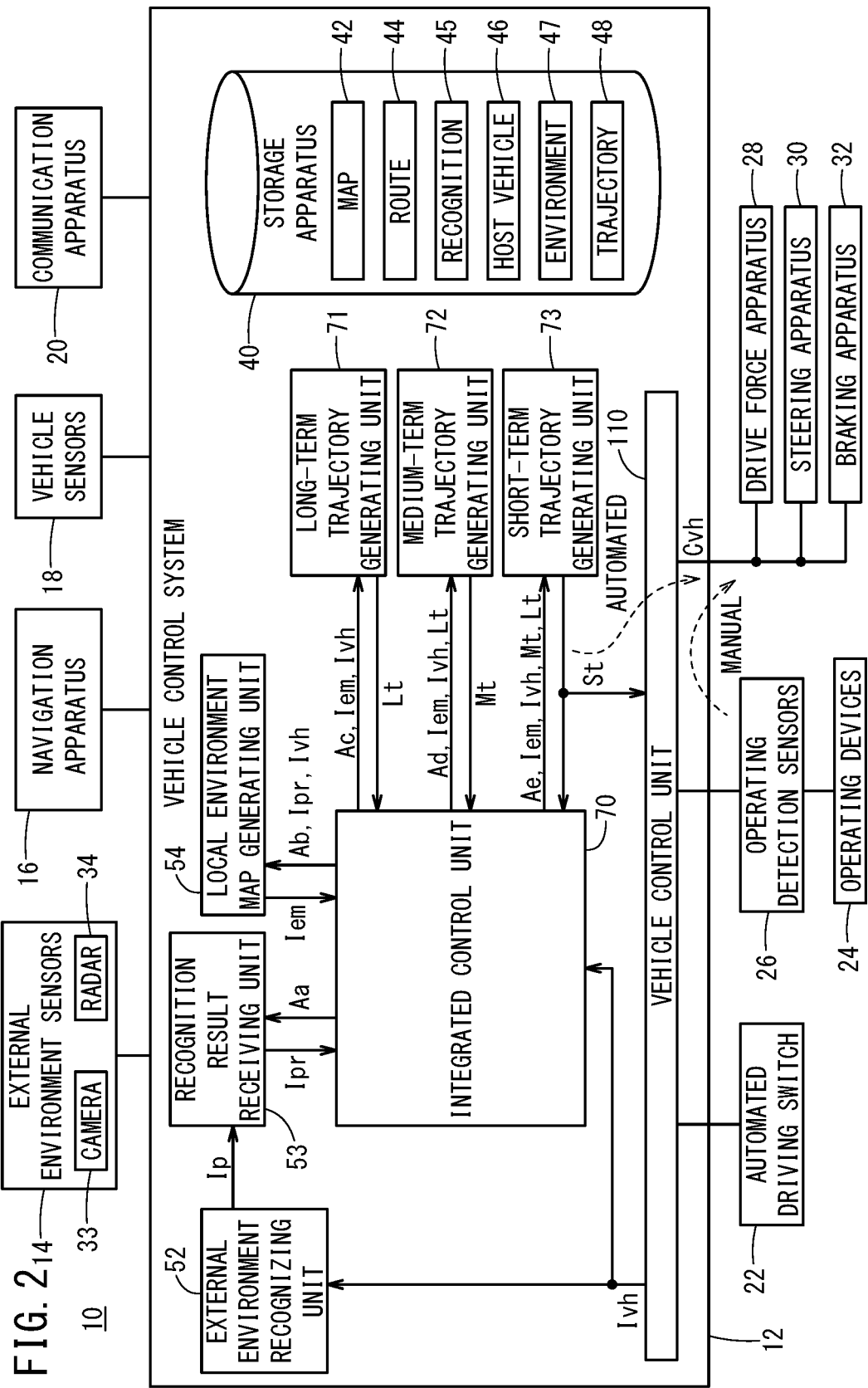
FIG. 2 is a schematic configurational block diagram of the vehicle control device of FIG. 1.

As shown in FIG. 2, the vehicle control device 10 includes a vehicle control system 12 (electronic control unit) that is the main component of the system performing processing while the host vehicle 11 travels, and further includes an input apparatus and an output apparatus connected to the vehicle control system 12 via communication lines. The input apparatus includes external environment sensors 14, a navigation apparatus 16, vehicle sensors 18, a communication apparatus 20, an automated driving switch 22 (automated driving SW), operating detection sensors 26, and the like. The output apparatus includes a drive force apparatus 28, a steering apparatus 30, a braking apparatus 32, and the like.

The external environment sensors 14 make a sensor device group (vehicle stop position detecting unit) that recognizes the conditions outside of the host vehicle 11, and is formed by one or more cameras 33 and one or more radars 34 in the present embodiment. The camera 33 and the radar 34 detect the outside according to the respective characteristics thereof, and output detection information based on this detection to the vehicle control system 12. The external environment sensors 14 may be formed by one type of device, or may include other devices. Examples of such other devices include an infrared sensor, an ultrasonic wave sensor, and a LIDAR (light detection device).

The navigation apparatus 16 detects and identifies the current position of the host vehicle 11 using a satellite positioning apparatus or the like, and calculates a route from the current position to a destination designated by a user. The information of the navigation apparatus 16 (map information, current position, calculated route, and the like) is provided to the vehicle control system 12 as needed, and is stored in a route information storage unit 44 or a map information storage unit 42 of a storage apparatus 40.

The vehicle sensors 18 make a sensor device group (vehicle state detecting unit and vehicle velocity detecting unit) that detects the state of the host vehicle 11 while the host vehicle 11 is travelling or the like and outputs the detection results to the vehicle control system 12. This sensor device group is exemplified by a vehicle velocity sensor that detects the velocity of the host vehicle 11, an acceleration sensor for detecting an acceleration, a yaw rate sensor for detecting an angular velocity about a vertical axis of the host vehicle 11, an orientation sensor that detects the orientation of the host vehicle 11, a gradient sensor that detects the gradient of the host vehicle 11, and the like. The detection information that is detected by the vehicle sensors 18 (or a vehicle control unit 110) is stored in a host vehicle state information storage unit 46 of the storage apparatus 40 as host vehicle state information Ivh.

The communication apparatus 20 is provided to communicate with external communication devices (roadside devices, other vehicles, servers, and the like) that are outside the host vehicle 11. For example, the communication apparatus 20 receives information concerning traffic lights (position or color) from roadside devices, probe information concerning other vehicles from other vehicles, updated map information or other information from a server, and transmits the probe information and the like of the host vehicle 11 to the outside.

The automated driving switch 22 is a switch used by the driver to switch between a manual driving mode and an automated driving mode. In the manual driving mode, the driver manipulates operating devices 24 of the host vehicle 11 to operate the output apparatuses (the drive force apparatus 28, steering apparatus 30, and braking apparatus 32) and cause the host vehicle 11 to travel and the like.

Examples of the operating devices 24 include an acceleration pedal, a steering wheel (handle), a brake pedal, a shift lever, a direction indication lever, and the like. Furthermore, each component of the operating devices 24 has the operating detection sensors 26 attached thereto to detect the presence of a manipulation by the driver, the manipulation amount, and the manipulation position. The operating detection sensors 26 output an acceleration pressing (opening) amount, a handle manipulation (steering) amount, a brake pressing amount, a shift position, a left or right turn direction, and the like to the vehicle control system 12 as the detection results.

In the automated driving mode, the host vehicle 11 travels and the like under the control of the vehicle control device 10, in a state where the driver does not manipulate the operating devices 24. When executing the automated driving mode, the vehicle control system 12 generates a travel plan (long-term trajectory, medium-term trajectory, and short-term trajectory described further below) based on the surrounding environment of the host vehicle 11, and suitably controls the output apparatuses (the drive force apparatus 28, steering apparatus 30, and braking apparatus 32) according to this travel plan.

The drive force apparatus 28 includes a drive force ECU (not shown in the drawings) and a drive source such as an engine, traction motor, or the like. The drive force apparatus 28 generates a travel drive force (torque) according to a vehicle control value Cvh input from the vehicle control system 12, and transmits the travel drive force to the vehicle wheels either directly or via a transmission.

The steering apparatus 30 includes an EPS (electric power steering) ECU (not shown in the drawings) and an EPS apparatus. The steering apparatus 30 changes the orientation of the wheels (steered wheels) according to the vehicle control value Cvh input from the vehicle control system 12.

The braking apparatus 32 is an electric servo brake combined with a hydraulic brake, and includes a brake ECU (not shown in the drawings) and a brake actuator. The braking apparatus 32 controls the wheels according to the vehicle control value Cvh input from the vehicle control system 12.

[Configuration of the Vehicle Control System 12]

The vehicle control system 12 is formed by an electronic control unit (ECU) a processor and input/output interface (not shown in the drawings) serving as hardware and the storage apparatus 40, and a plurality of function realizing units are formed therein. Specifically, the vehicle control system 12 includes an external environment recognizing unit 52, a recognition result receiving unit 53, a local environment map generating unit 54, an integrated control unit 70 (task synchronization module), a long-term trajectory generating unit 71, a medium-term trajectory generating unit 72, a short-term trajectory generating unit 73, and the vehicle control unit 110. In the present embodiment, the function realizing units are software function units formed by the processor executing a program stored in the storage apparatus 40, but these function realizing units may instead be realized by hardware function units made from integrated circuits or the like.

The external environment recognizing unit 52 generates information (referred to below as an external environment recognition result Ip) serving as an external environment recognition result by extracting a target object existing outside the host vehicle 11, using each piece of detection information input from the external environment sensors 14, the navigation apparatus 16, the communication apparatus 20, and the like. When generating the external environment recognition result Ip, the external environment recognizing unit 52 references the detection results of the radar 34 and the like, the host vehicle state information Ivh transmitted from the vehicle sensors 18 and the vehicle control unit 110, and the like to also recognize a relative positional relationship of the target object relative to the host vehicle 11 (the orientation and distance of the host vehicle 11 relative to the target object). At this time, the external environment recognizing unit 52 may recognize the relative positional relationship by arranging the extracted target object in a two-dimensional plane with the host vehicle 11 as a reference (host vehicle coordinate system).

For example, the external environment recognizing unit 52 extracts a target object such as a lane marker (white line or the like), a guard rail, a curb, a stop line, a traffic signal (signal stop line), an indicator, an obstacle, a traffic participant, or the like on the road that the host vehicle 11 is travelling on, based on image information of the camera 33. Here, items that define travel routes such as a lane marker (whit line or the like), guard rail, and curb can be said to be static information that does not change in a short time. On the other hand, obstacles and traffic participants can be said to be dynamic information that does change in a short time. The stop lines, traffic signals, and the like installed on the travel route affect whether it is necessary to stop by changing over time or according to the surrounding environment, and therefore are handled as dynamic information in the vehicle control device 10 according to the present embodiment.

The recognition result receiving unit 53 periodically receives the external environment recognition result Ip recognized by the external environment recognizing unit 52, and updates the old information. The recognition result receiving unit 53 transmits the external environment recognition result Ip to the integrated control unit 70 as external environment recognition information Ipr, at the timing when a computation command Aa is received from the integrated control unit 70. The external environment recognition information Ipr is stored in an external environment recognition information storage unit 45 of the storage apparatus 40, as integrated information or individual information for each target object extracted in the external environment recognition result Ip.

The local environment map generating unit 54 generates local environment map information Iem by calculating the route to be travelled by the host vehicle 11, based on the external environment recognition information Ipr and the host vehicle state information Ivh. The local environment map generating unit 54 receives a computation command Ab and the external environment recognition information Ipr from the integrated control unit 70 at an arbitrary timing, and performs a computation for obtaining the local environment map information Iem. This local environment map information Iem is stored in a local environment map information storage unit 47 of the storage apparatus 40.

As an example, the local environment map information Iem includes left-right boundary line information indicating a range on both sides in which the host vehicle 11 can travel, center line information indicating the center (center position in the width direction) in the left-right boundary line information, optimal route information indicating a route on which the host vehicle 11 can travel comfortably, and the like. The left-right boundary line information, the center line information, and the optimal route information may be generated as sequences of coordinate points arranged discretely in a two-dimensional plane. In this way, the relationship to the target objects in other pieces of the external environment recognition information Ipr is simplified and the processing load of the vehicle control system 12 is lightened. Furthermore, the local environment map information Iem includes dynamic information of the external environment recognition information Ipr (stop lines, signal stop lines, obstacles, traffic participants, and the like). This dynamic information may be information of coordinate points or lines connecting a plurality of coordinate points. In this way, the processing load when generating the trajectories described further below is reduced.

The integrated control unit 70 synchronizes the tasks (processing operations) of the recognition result receiving unit 53, the local environment map generating unit 54, the long-term trajectory generating unit 71, the medium-term trajectory generating unit 72, and the short-term trajectory generating unit 73, and provides the information necessary for computation to each function realizing unit. The integrated control unit 70 counts a reference computation period therein, implements processing by outputting computation commands to each function realizing unit according to a timing based on this reference computation period, and receives the results of the processing.

On the other hand, the long-term trajectory generating unit 71, the medium-term trajectory generating unit 72, and the short-term trajectory generating unit 73 each generate a trajectory including a velocity required for the velocity control of the host vehicle 11 and a route required for the steering control of the host vehicle 11, according to commands from the integrated control unit 70. The long-term trajectory generating unit 71 generates a long-term trajectory Lt that is a trajectory for a somewhat long time period (e.g. 10 seconds) during travel of the host vehicle 11. The medium-term trajectory generating unit 72 generates a medium-term trajectory Mt that is a trajectory for a time period (e.g. 5 seconds) shorter than the time period of the long-term trajectory Lt. The short-term trajectory generating unit 73 generates a short-term trajectory St that is a trajectory for a time period (e.g. 1 second) shorter than the time period of the medium-term trajectory Mt.

More specifically, the long-term trajectory generating unit 71 generates the long-term trajectory Lt based on a computation command Ac output from the integrated control unit 70, the local environment map information Iem, and the host vehicle state information Ivh, and the like. The long-term trajectory Lt is a point sequence indicating long-term travel targets that takes into consideration the comfort of the travel (not performing sudden steering, sudden acceleration or deceleration, or the like), based mainly on the left-right boundary line information, the center line information, and the optimal route information of the local environment map information Iem. This long-term trajectory Lt is calculated as information in which a plurality of coordinate points are arranged over a length of time that is relatively longer than that of the medium-term trajectory Mt.

For example, the long-term trajectory generating unit 71 generates the long-term trajectory Lt in which coordinate points including time or speed information within a 10-second time period are arranged at intervals of hundreds of milliseconds (9 times the reference computation period), and outputs the generated long-term trajectory Lt to the integrated control unit 70. This long-term trajectory Lt is stored in a trajectory information storage unit 48 of the storage apparatus 40.

The medium-term trajectory generating unit 72 (target speed setting unit) generates the medium-term trajectory Mt based on a computation command Ad output from the integrated control unit 70, the local environment map information Iem, the host vehicle state information Ivh, and the long-term trajectory Lt. The medium-term trajectory Mt is calculated as a point sequence in which the dynamic information included in the local environment map information Iem is considered, in order to show the travel targets that are applicable to the situation around the host vehicle 11 several seconds in the future.

For example, in a case where the external environment recognizing unit 52 has discovered a parked vehicle (dynamic information) in front of the host vehicle 11 in the traveling direction, the host vehicle 11 avoids contact with this parked vehicle based on the medium-term trajectory Mt generated by the medium-term trajectory generating unit 72 and the short-term trajectory St generated by the short-term trajectory generating unit 73. Furthermore, the medium-term trajectory generating unit 72 has a function to, when the vehicle stop position Ps is detected, calculate a trajectory causing the host vehicle 11 to stop at the vehicle stop position Ps (see FIG. 1)

For example, the medium-term trajectory generating unit 72 generates the medium-term trajectory Mt in which coordinate points including time or speed information within a 5-second time period are arranged at intervals of a hundred and tens of milliseconds (3 times the reference computation period), and outputs the generated medium-term trajectory Mt to the integrated control unit 70. This medium-term trajectory Mt is stored in the trajectory information storage unit 48 of the storage apparatus 40.

The short-term trajectory generating unit 73 (target speed setting unit) generates the short-term trajectory St based on a computation command Ae output from the integrated control unit 70, the local environment map information Iem, the host vehicle state information Ivh, the long-term trajectory Lt, and the medium-term trajectory Mt. The short-term trajectory St calculates a time sequence with the shortest length of time, and therefore corresponds to the vehicle dynamics of the host vehicle 11. Therefore, at each individual coordinate point forming the short-term trajectory St, a position x in a longitudinal direction along a center line CL (see FIG. 1) of a lane marker, a position y in a lateral direction, an orientation angle $\theta z$, a velocity vs, an acceleration va, a steering angle $\delta st$, and the like are included.

For example, the short-term trajectory generating unit 73 generates the short-term trajectory St by calculating coordinate points including information of the vehicle dynamics described above in a 1-second time period, at intervals of several milliseconds (the reference computation period). This short-term trajectory St is transmitted directly to the vehicle control unit 110, and is used by the vehicle control unit 110 to perform travel control of the host vehicle 11. Furthermore, the short-term trajectory generating unit 73 also outputs the generated short-term trajectory St to the integrated control unit 70. This short-term trajectory St is stored in the trajectory information storage unit 48 of the storage apparatus 40.

On the other hand, the vehicle control unit 110 converts the coordinate points including the vehicle dynamics into a vehicle control value Cvh and outputs this vehicle control value Cvh to the drive force apparatus 28, the steering apparatus 30, and the braking apparatus 32, such that the host vehicle 11 travels along the short-term trajectory St input thereto.

[Configuration for Implementing Stopping Control]

Returning to FIG. 1, when the external environment recognizing unit 52 (see FIG. 2) detects the vehicle stop position Ps while the host vehicle 11 is travelling, the vehicle control device 10 according to the present embodiment performs the stopping control to stop the host vehicle 11 at the vehicle stop position Ps. To implement this stopping control, function realizing units for performing the stopping control are formed respectively in the external environment recognizing unit 52, the medium-term trajectory generating unit 72, and the short-term trajectory generating unit 73.

Figure 3:
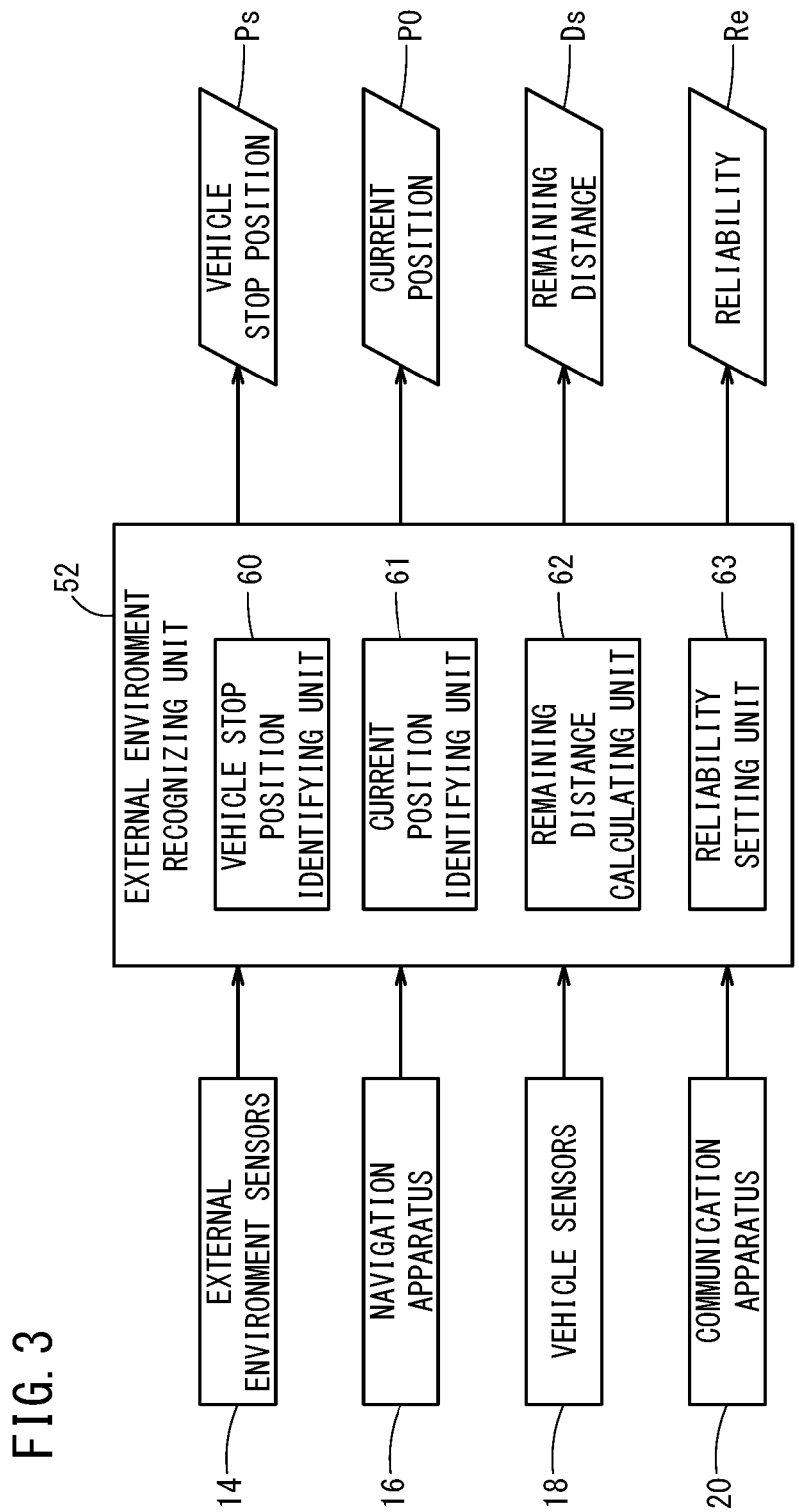
FIG. 3 is a block diagram showing a configuration of the external environment recognizing unit when the stopping control is performed.

As shown in FIG. 3, the external environment recognizing unit 52 provides various types of data (the external environment recognition information Ipr) for having the medium-term trajectory generating unit 72 and the short-term trajectory generating unit 73 generate the trajectory for decelerating the host vehicle 11 when the stopping control is performed. Therefore, the external environment recognizing unit 52 includes a vehicle stop position identifying unit 60, a current position identifying unit 61, a remaining distance calculating unit 62, and a reliability setting unit 63 to generate a vehicle stop position Ps, a current position P0, a remaining distance Ds (see FIG. 1), and a reliability Re. These pieces of data (the external environment recognition results Ip) are output to the local environment map generating unit 54 via the integrated control unit 70.

The vehicle stop position identifying unit 60 identifies a target object such as a stop line or a red traffic signal, at which the host vehicle 11 needs to stop at the current time point, as the vehicle stop position Ps based on the detection information (image information or detection signal) detected by the external environment sensors 14. The vehicle stop position Ps creates a table from the coordinate points of the width-direction center positions of the left-right lane markers extracted individually in the two-dimensional plane having the host vehicle 11 as a reference, for example.

The current position identifying unit 61 identifies the current position P0 (relative position with respect to a specified target object) of the host vehicle 11 in the two-dimensional plane, based on the detection information detected by the external environment sensors 14, the host vehicle state information Ivh detected by the vehicle sensors 18, and the like. The identification of the current position P0 of the host vehicle 11 may include a correction using the information of the current position or the map information of the navigation apparatus 16, or the current position or map information may be used as-is.

The remaining distance calculating unit 62 calculates the remaining distance Ds until the host vehicle 11 reaches the vehicle stop position Ps, based on the identified vehicle stop position Ps and current position P0. When calculating the remaining distance Ds, the curvature of the road is taken into account, based on the extracted information of the lane markers. Therefore, the remaining distance Ds is calculated as a value along the shape of the road, and not calculated simply as a linear distance between the vehicle stop position Ps and the current position P0.

The reliability setting unit 63 sets the reliability of the information concerning the remaining distance Ds and the vehicle stop position Ps and current position P0 of the external environment recognition information Ipr specified by the configuration described above as a high or low degree (reliability Re). The setting of this reliability Re is described in detail further below.

When generating the left-right boundary line information, the center line information, and the optimal route information with the local environment map generating unit 54, the data described above (the vehicle stop position Ps, current position P0, remaining distance Ds, and reliability Re) is included. Therefore, by transmitting the local environment map information Iem to the medium-term trajectory generating unit 72 and the short-term trajectory generating unit 73, the local environment map information Iem is used in the generation of the stopping trajectory (the medium-term stopping trajectory and short-term stopping trajectory) for implementing the stopping control.

Figure 4:
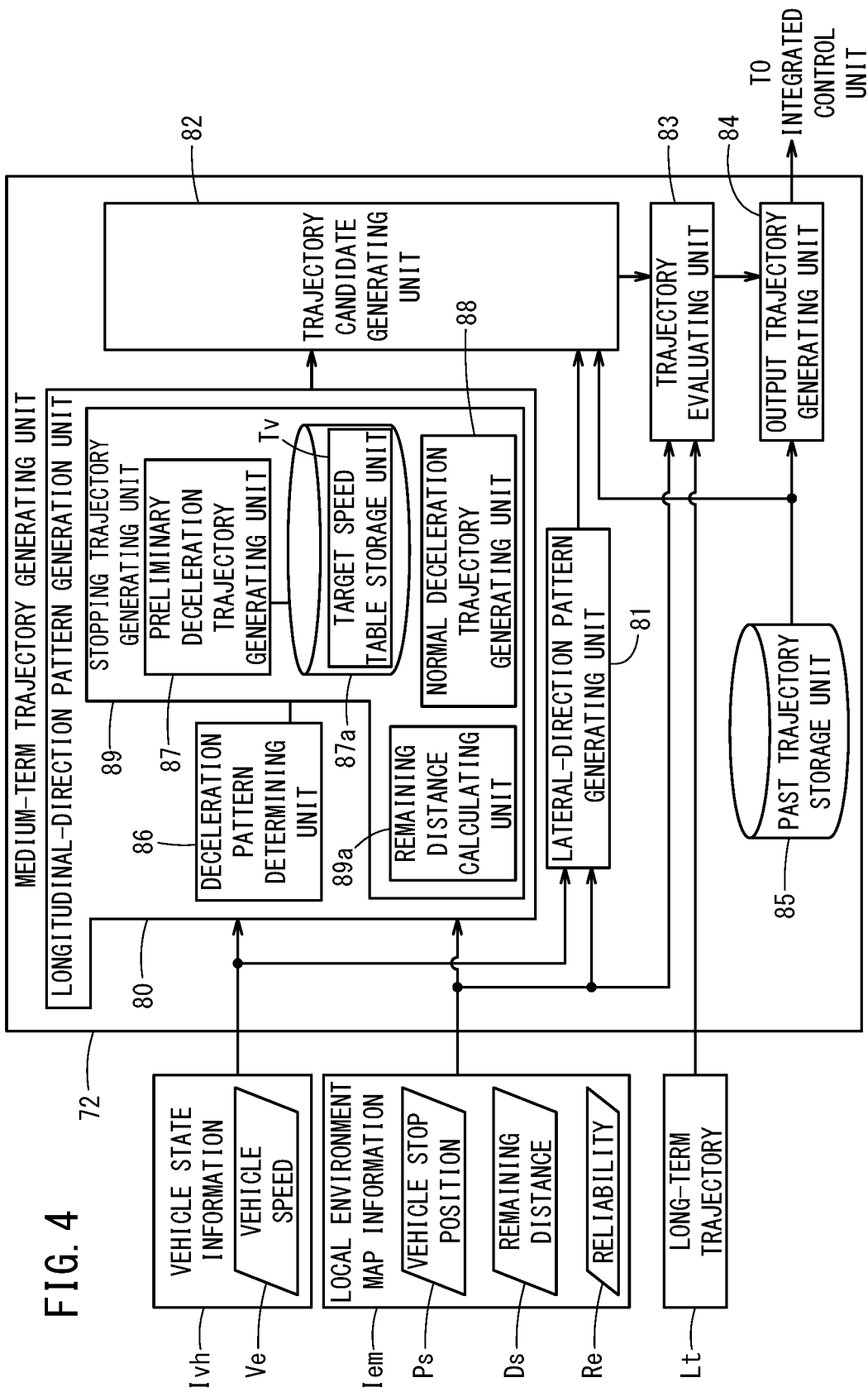
FIG. 4 is a block diagram showing a configuration of the medium-term trajectory generating unit when the stopping control is performed.

Therefore, as shown in FIG. 4, the medium-term trajectory generating unit 72 includes a longitudinal-direction pattern generation unit 80, a lateral-direction pattern generating unit 81, a trajectory candidate generating unit 82, a trajectory evaluating unit 83, an output trajectory generating unit 84, and a past trajectory storage unit 85. The past trajectory storage unit 85 stores the medium-term trajectories Mt computed in the past (including at least the medium-term trajectory Mt output by the previous computation). Furthermore, the long-term trajectory Lt generated by the long-term trajectory generating unit 71 is input to the medium-term trajectory generating unit 72, along with the host vehicle state information Ivh and the local environment map information Iem.

The longitudinal-direction pattern generation unit 80 generates a trajectory pattern of change over time of the coordinate points in the front-rear direction along the width-direction central axis of the host vehicle 11 (vehicle longitudinal direction), i.e. a pattern that mainly relates to vehicle velocity, during automated driving. With this longitudinal-direction pattern generation unit 80, a plurality of trajectory patterns are calculated using the host vehicle state information Ivh and the local environment map information Iem, without considering the long-term trajectory Lt or past trajectories. Furthermore, when generating the medium-term stopping trajectory, a deceleration pattern determining unit 86 and a stopping trajectory generating unit 89, which includes therein a preliminary deceleration trajectory generating unit 87 (preliminary deceleration setting unit) and a normal deceleration trajectory generating unit 88 (normal deceleration setting unit), are formed. Furthermore, a remaining distance calculating unit 89a that corrects the remaining distance Ds of the local environment map information Iem to obtain a more accurate remaining distance is provided inside the stopping trajectory generating unit 89.

Here, as described above, in conventional stopping control, the control for stopping the host vehicle 11 at the vehicle stop position Ps is performed at the point when the vehicle stop position Ps is accurately detected. However, if the host vehicle 11 has a high velocity at the point where the vehicle stop position Ps is accurately detected, there is a possibility that it would be difficult to stop the host vehicle 11 at the vehicle stop position Ps (or that such stopping would require sudden braking).

In contrast to this, the vehicle control device 10 according to the present embodiment is configured to perform preliminary deceleration even if the reliability Re of the detected vehicle stop position Ps is low, thereby smoothly stopping the host vehicle 11 at the vehicle stop position Ps. Therefore, the deceleration pattern determining unit 86 of the longitudinal-direction pattern generation unit 80 makes the judgment to operate one of the normal deceleration trajectory generating unit 88 and the preliminary deceleration trajectory generating unit 87 of the stopping trajectory generating unit 89 based on the reliability Re included in the local environment map information Iem.

Figure 5:
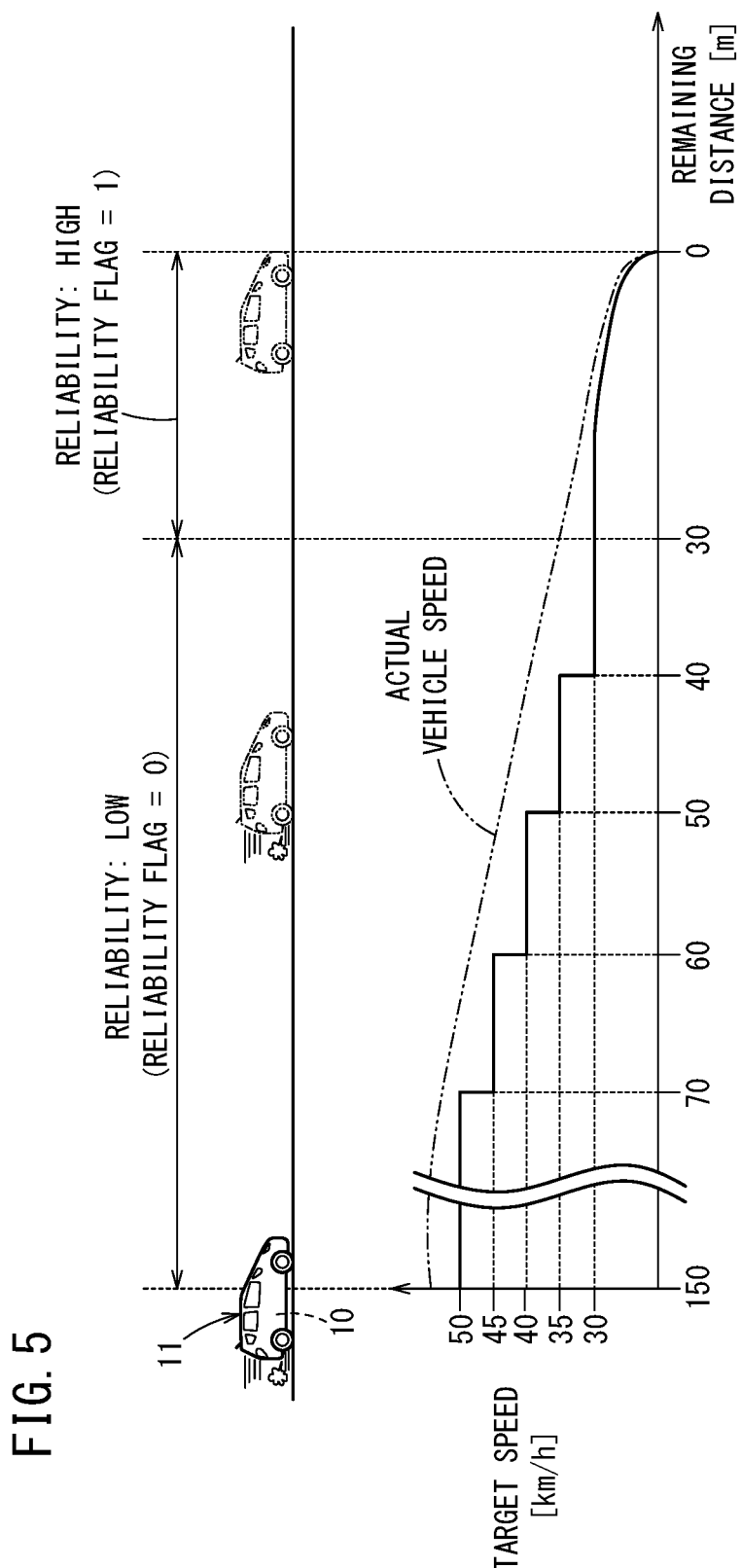
FIG. 5 is a descriptive diagram describing the correspondence relationship between the remaining distance and the target speed, based on the reliability when the stopping control is performed.

For example, as shown in FIG. 5, the reliability Re of the local environment map information Iem (the vehicle stop position Ps, current position P0, or remaining distance Ds) is set to be low when the remaining distance Ds to the vehicle stop position Ps is greater than or equal to 30 m, and is set to be high when the remaining distance Ds is less than 30 m. In this case, the preliminary deceleration trajectory generating unit 87 is selected by the deceleration pattern determining unit 86 when the reliability Re is in the low range (the region where the remaining distance Ds is greater than or equal to 30 m in the present example).

The preliminary deceleration trajectory generating unit 87 calculates the longitudinal direction pattern (preliminary medium-term stopping trajectory) for preliminarily decelerating the host vehicle 11 for the detected vehicle stop position Ps. The generation of the preliminary medium-term stopping trajectory includes setting a target speed that changes according to the remaining distance Ds, using a predetermined setting method. In the present embodiment, the predetermined setting method is referencing a target speed table Tv in which target speeds correspond (are tied) to each prescribed interval of the remaining distance Ds.

This target speed table Tv is stored in a target speed table storage unit 87a of the medium-term trajectory generating unit 72 (storage apparatus 40) and is read when the preliminary deceleration trajectory generating unit 87 operates.

In the target speed table Tv, high vehicle velocities are associated with long remaining distances Ds, and low vehicle velocities are associated with short remaining distances Ds. Furthermore, the target speed table Tv is a velocity map that changes the target speed in a stepped manner according to the remaining distance Ds when the host vehicle 11 decelerates, i.e. reduces the target speed in a stepped manner as the remaining distance Ds becomes shorter. By changing the target speed in a stepped manner relative to the remaining distance Ds, when deceleration is performed in a case where the velocity of the host vehicle 11 is higher than the target speed, the velocity of the host vehicle 11 actually drops smoothly. Furthermore, it is unlikely for this process to be affected by errors in the vehicle stop position Ps.

In the target speed table Tv in the example of FIG. 5, the target speed is set to be 50 km/h when the remaining distance Ds is greater than or equal to 70 m, 45 km/h when the remaining distance Ds is from 70 m to 60 m, 40 km/h when the remaining distance Ds is from 60 m to 50 m, 35 km/h when the remaining distance Ds is from 50 m to 40 m, and 30 km/h when the remaining distance Ds is less than or equal to 40 m. The target speed table Tv may be designed such that the target speed is lowered smoothly (continuously) according to the remaining distance Ds, instead of being lowered in a stepped manner relative to the remaining distance Ds. Furthermore, the method for setting the target speed for the preliminary deceleration can be any of a variety of methods other than referencing the target speed table Tv, such as using a computation enabling calculation of the target speed with the remaining distance Ds as an input, for example.

The preliminary deceleration trajectory generating unit 87 compares the vehicle velocity included in the host vehicle state information Ivh to the target speed set at the moment, and if the vehicle velocity is higher than the target speed, generates a preliminary medium-term stopping trajectory corresponding to the target speed of the target speed table Tv. On the other hand, if the vehicle velocity of the host vehicle 11 is always less than the target speed, the braking force may be restricted and a preliminary medium-term stopping trajectory may be generated that continues the deceleration of the host vehicle 11 (travel by inertia). With the stopping control, there is a concern that accelerating the host vehicle 11 in order to match the target speed will cause a decrease in the travel efficiency, fuel consumption, comfort of the vehicle occupants, and the like.

The remaining distance Ds referenced by the preliminary deceleration trajectory generating unit 87 has been calculated by the remaining distance calculating unit 89a (the remaining distance Ds of the local environment map information Iem has been corrected). For example, the remaining distance calculating unit 89a calculates the distance according to the route on which the host vehicle 11 actually travels, using the optimal route information and the like of the local environment map information Iem.

When the reliability Re transitions from a low range to a high range (the region where the remaining distance Ds is less than 30 m in the example of the drawing), the stopping trajectory generating unit 89 selects the normal deceleration trajectory generating unit 88 using the deceleration pattern determining unit 86. The normal deceleration trajectory generating unit 88 calculates the longitudinal direction pattern (normal medium-term stopping trajectory) for decelerating normally for the detected vehicle stop position Ps. In this case, the normal deceleration trajectory generating unit 88 sets a target speed that changes in finer increments than the target speed set by the preliminary deceleration trajectory generating unit 87, based on the remaining distance Ds (calculated by the remaining distance calculating unit 89a) and the vehicle velocity.

For example, in order to suppress the effect of low vehicle velocity on following vehicles and the like, the normal medium-term stopping trajectory is set to restrict the drop in velocity at positions that are a certain distance from the vehicle stop position Ps and to exhibit a non-linear velocity change that significantly reduces the target speed near the vehicle stop position Ps.

Here, when generating the normal medium-term stopping trajectory (when the reliability Re is high), the vehicle velocity is reduced to a certain velocity due to the preliminary deceleration at the point when the reliability Re of the external environment recognition information Ipr is low. Therefore, the vehicle control device 10 can generate the normal medium-term stopping trajectory without trouble, and can comfortably stop the host vehicle 11 at the vehicle stop position Ps. If the reliability Re of the external environment recognition information Ipr is high from the start even though the vehicle stop position Ps is far from the host vehicle 11, only the normal deceleration trajectory generating unit 88 is caused to operate and the preliminary deceleration trajectory generating unit 87 does not operate. In this case as well, since the vehicle velocity is reduced over a long time period, it is possible to comfortably stop the host vehicle 11 at the vehicle stop position Ps.

The reliability Re for setting the operations of the preliminary deceleration trajectory generating unit 87 and the normal deceleration trajectory generating unit 88 is set by the reliability setting unit 63 (see FIG. 3) at the step when the external environment recognizing unit 52 generates the external environment recognition information Ipr. The reliability setting unit 63 may set the reliability Re as a numerical amount in a range where 0 is the lowest and 1 is the highest.

Figure 6:
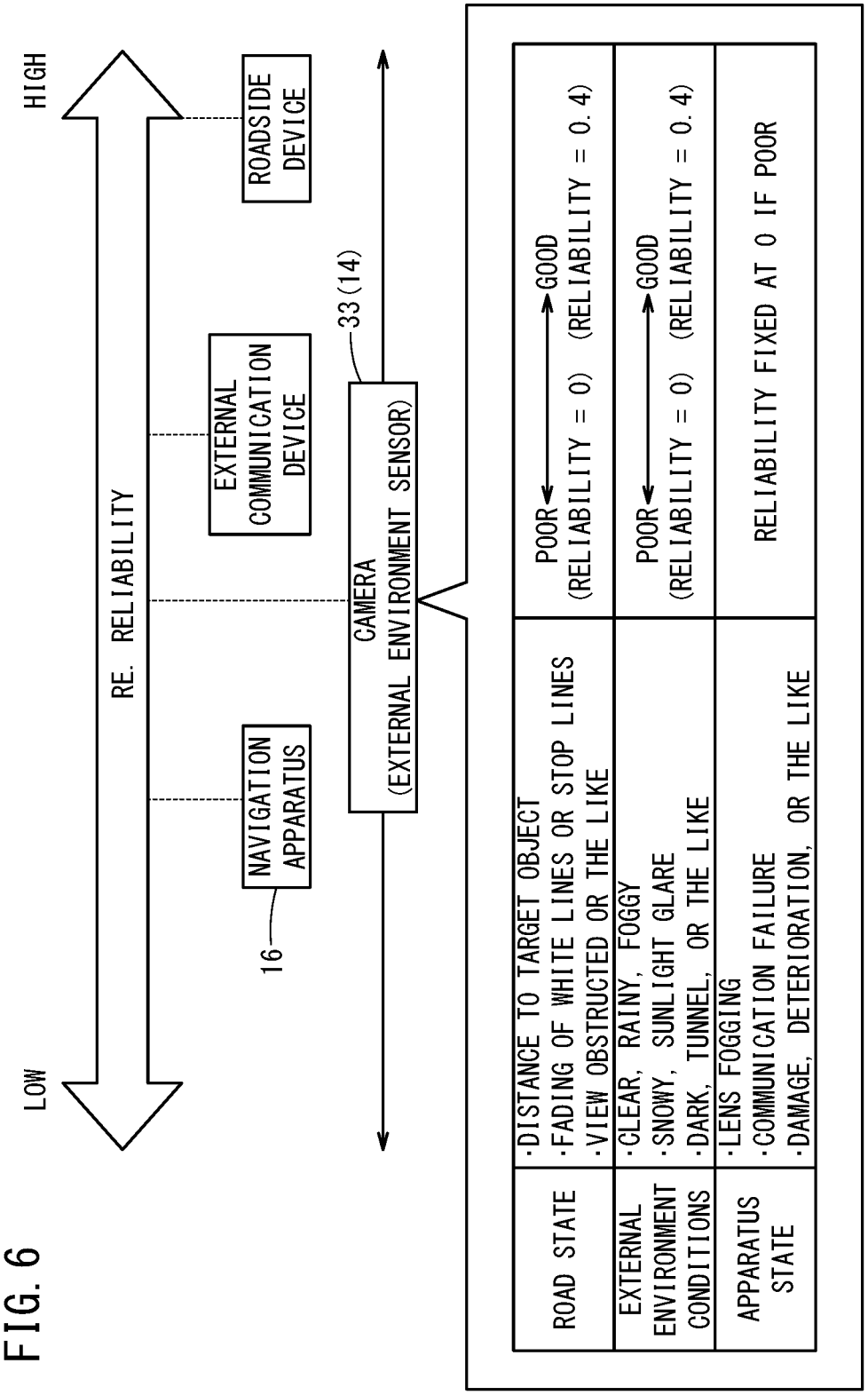
FIG. 6 is a descriptive diagram showing the setting method of the reliability when the stopping control is performed.

For example, as shown in FIG. 6, the reliability setting unit 63 may assign the numerical value of the reliability Re according to the type of each apparatus acquired by the external environment recognizing unit 52. As an example, the information acquired from a roadside device provided on the road via the communication apparatus 20 of the host vehicle 11 has a high degree of certainty, and therefore this information is given a high value (e.g. reliability Re=1). Information acquired from an external communication device such as another vehicle or a server via the communication apparatus 20 of the host vehicle 11 has a lower degree of certainty than the information from a roadside device, and is therefore given a slightly lower value (e.g. reliability Re=0.7). Information acquired from the navigation apparatus 16 must take detection errors into consideration, and is therefore given a low value (e.g. reliability Re=0.3).

The external environment sensors 14 such as the camera 33 may change the reliability Re according to the situation, to change the reliability Re according to the time or place. For example, the state of the road, the external environment conditions, and the state of the apparatus can be reasons to change the reliability Re of the camera 33.

The road state can be divided into elements such as the distance from the host vehicle 11 to a target object, the quality of the state of white lines and stop lines, the quality of the views of another car or a pedestrian, and the like. For example, the reliability Re is set to a low value (reliability Re=0) when the situation is that there is a long distance to the target object, the white lines or stop lines are faded, the view is obstructed, or the like. On the other hand, if each element has only a small effect, the reliability Re may be set to a prescribed value (e.g. reliability Re=0.4).

The external environment conditions can be divided into elements such as the weather, incident angle of sunlight, surrounding brightness, and the like. For example, the reliability Re is set to a low value (reliability Re=0) when the situation is that the weather is rainy, foggy, or snowy, sunlight glare appears in the image, it is dark due to being night time or in a tunnel, or the like. On the other hand, if each element has only a small effect, the reliability Re may be set to a prescribed value (e.g. reliability Re=0.4).

The apparatus state can be divided into elements such as the quality of the lens of the camera 33, the quality of the communication state between the camera 33 and the vehicle control system 12, the presence or lack of damage or deterioration of the camera 33, and the like. For example, even if the road state and the external environment conditions are favorable, the reliability Re may be fixed at 0 when the situation is that the lens is foggy, communication failure occurs, damage or deterioration occurs, or the like.

Each element described above is identified by the external environment recognizing unit 52 performing various process (e.g. a comparison of image information from a plurality of cameras, a comparison with past image information, an evaluation of the host vehicle state, an evaluation of the sharpness of the extracted target object, an evaluation of brightness, an evaluation of light and dark, an evaluation of an image correction amount, detection of damage or deterioration, or detection of a communication state) on the image information input from the camera 33. The reliability Re may be changed according to the type of information, the instruction content from a device, and the communication state for the roadside devices, external communication devices, navigation apparatus 16, and the like as well.

The reliability setting unit 63 plugs the parameters of the reliability Re obtained for each of the causes such as described above into a predetermined mathematical expression, to calculate one reliability Re for the external environment recognition result Ip. In a case where information is obtained from a plurality of apparatuses such as the camera 33, the navigation apparatus 16, and the communication apparatus 20, the one reliability Re is calculated using preset information weighting (importance) or the like. For example, in a case where information from a roadside device and image information from the camera 33 are acquired, the reliability Re may be set with the weight W1 for the information from the roadside device being high (e.g. W1=0.8) and the weight W2 for the information from the camera 33 being low (e.g. 1−W1=0.2). The camera 33 may set the weight W2 to be high if the reliability Re based on each element described above is high, and may set the weight W2 to be low if the reliability Re of each element is low.

The deceleration pattern determining unit 86 (reliability determining unit) shown in FIG. 4 receives the reliability Re output by the external environment recognizing unit 52 and compares this reliability Re to a reliability determination threshold value (not shown in the drawings) stored in advance in the deceleration pattern determining unit 86. If the received reliability Re is less than or equal to the reliability determination threshold value, a reliability flag is set to 0 and the preliminary deceleration trajectory generating unit 87 is caused to operate. If the received reliability Re is greater than the reliability determination threshold value, the reliability flag is set to 1 and the normal deceleration trajectory generating unit 88 is caused to operate. The external environment recognizing unit 52 or the local environment map generating unit 54 may be configured to include a reliability determining unit and to output the local environment map information Iem including the reliability flag (0 or 1).

The lateral-direction pattern generating unit 81 generates a trajectory pattern relating to the change over time of coordinate points in the left and right turning directions that are shifted left or right from the width-direction central axis of the host vehicle 11, i.e. a trajectory pattern mainly relating to steering, during the automated driving. With the lateral-direction pattern generating unit 81 as well, a plurality of trajectory patterns corresponding to the steering ability (steering wheel steering angle) of the host vehicle 11 are calculated using the host vehicle state information Ivh and the local environment map information Iem, without considering the long-term trajectory Lt or past trajectories.

The trajectory candidate generating unit 82 generates a plurality of medium-term trajectory candidates that use a simple vehicle model, by combining the plurality of generated longitudinal direction patterns and the plurality of generated lateral direction patterns. At this time, the trajectory candidate generating unit 82 calculates a point sequence in which the coordinate points can be followed by the host vehicle 11 and change over time in the local environment map information Iem (in a two-dimensional plane), based on the past medium-term trajectories Mt stored in the past trajectory storage unit 85. When the stopping control is performed, a medium-term stopping trajectory (preliminary medium-term stopping trajectory or normal medium-term stopping trajectory) is generated by combining the longitudinal direction pattern and the lateral direction pattern.

The trajectory evaluating unit 83 continues to identify the optimal medium-term trajectory Mt by evaluating the plurality of medium-term trajectory candidates generated by the trajectory candidate generating unit 82, based on the local environment map information Iem and the long-term trajectory Lt. For example, if the local environment map information Iem includes dynamic information of an obstacle or the like to be avoided by the host vehicle 11, a trajectory that enables avoidance of the obstacle is evaluated. As another example, if the local environment map information Iem does not include information for avoidance, a trajectory near the long-term trajectory Lt among the medium-term trajectory candidates is evaluated.

The output trajectory generating unit 84 selects the optimal medium-term trajectory Mt among the medium-term trajectories evaluated by the trajectory evaluating unit 83, outputs the selected medium-term trajectory Mt to the integrated control unit 70, and also stores the selected medium-term trajectory Mt in the past trajectory storage unit 85.

[Process Flow of the Stopping Control]

Figure 7:
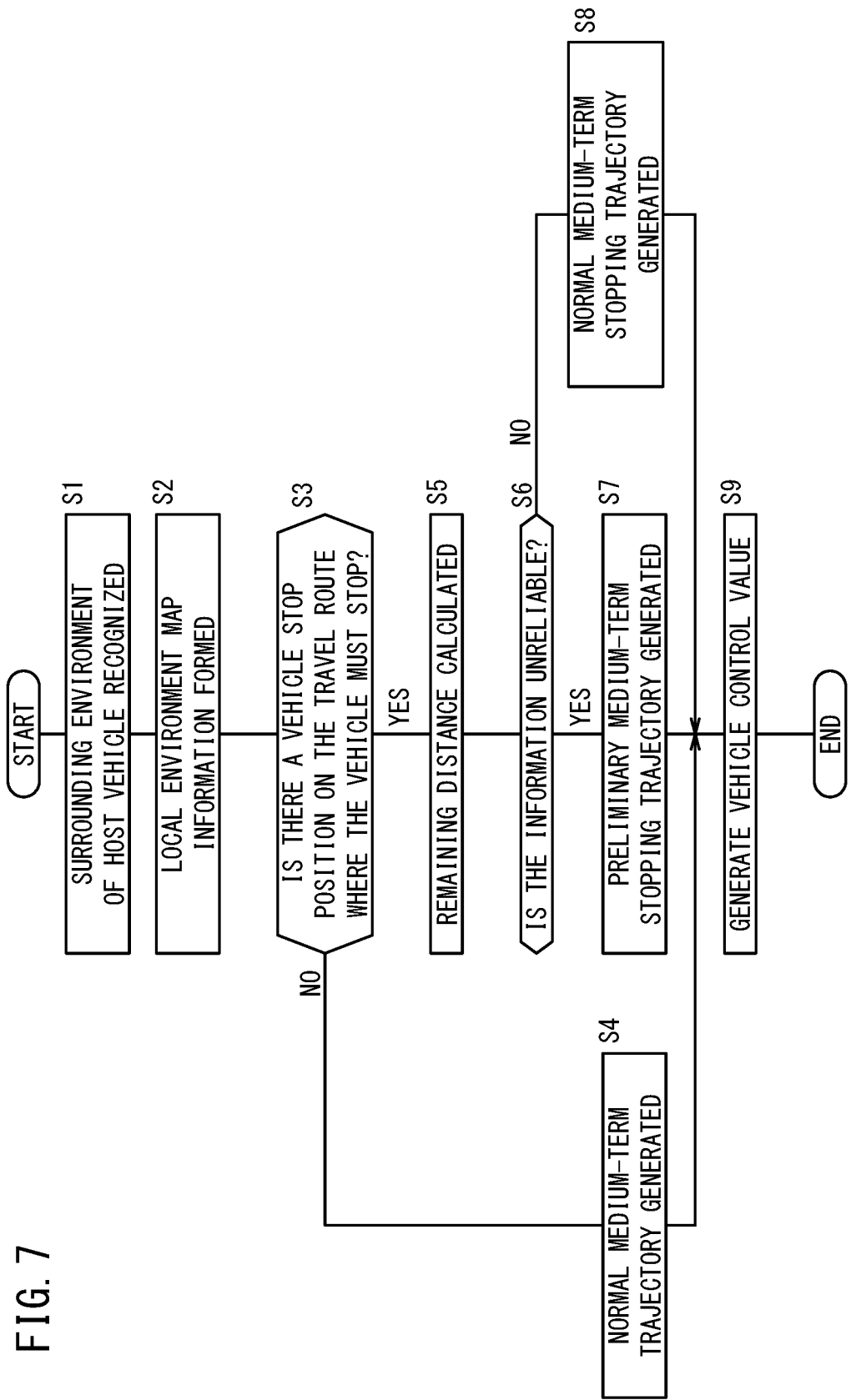
FIG. 7 is a flow chart showing a process flow of the external environment recognizing unit and the medium-term trajectory generating unit when the stopping control is performed.

The following describes a process flow of the external environment recognizing unit 52, the local environment map generating unit 54, and the medium-term trajectory generating unit 72 when the stopping control is performed, with reference to FIG. 7. The vehicle control device 10 implements automated driving control based on instructions from the driver (turning ON the automated driving switch 22 or the like) when the host vehicle 11 is travelling. In the automated driving control, the surrounding environment of the host vehicle 11 is detected by the external environment sensors 14, the navigation apparatus 16, the communication apparatus 20, and the like, and the surrounding environment of the host vehicle 11 is recognized by the external environment recognizing unit 52 (step S1).

Next, the local environment map generating unit 54 forms the local environment map information Iem based on the external environment recognition information Ipr output by the recognition result receiving unit 53 (external environment recognizing unit 52) (step S2). The medium-term trajectory generating unit 72 determines whether there is a vehicle stop position Ps (stop line, traffic signal, or the like) at which the vehicle must stop on the travel path, based on the local environment map information Iem (step S3).

If a vehicle stop position Ps is not detected at step S3, the medium-term trajectory generating unit 72 generates the normal medium-term trajectory Mt for travel that does not include the stopping control (step S4). At this time, the medium-term trajectory generating unit 72 generates a suitable medium-term trajectory Mt by causing the longitudinal-direction pattern generation unit 80, the lateral-direction pattern generating unit 81, the trajectory candidate generating unit 82, the trajectory evaluating unit 83, and the output trajectory generating unit 84 to operate in the manner described above.

On the other hand, if a vehicle stop position Ps is detected at step S3, the remaining distance calculating unit 89a calculates the remaining distance Ds (step S5). The remaining distance Ds may be the remaining distance included in the local environment map information Iem.

Next, the deceleration pattern determining unit 86 of the medium-term trajectory generating unit 72 determines whether the information is reliable, based on the reliability Re included in the local environment map information Iem (step S6). If the information is determined to be unreliable (the reliability Re is less than the reliability determination threshold value), the preliminary deceleration trajectory generating unit 87 is caused to operate, and if the information is determined to be reliable (the reliability Re is greater than the reliability determination threshold value), the normal deceleration trajectory generating unit 88 is caused to operate.

At step S7, the preliminary deceleration trajectory generating unit 87 references the target speed table Tv read from the target speed table storage unit 87a, and sets the target speed corresponding to the remaining distance Ds. If the current vehicle speed Ve is greater than the target speed, the preliminary deceleration trajectory generating unit 87 generates a preliminary medium-term stopping trajectory for preliminarily decelerating the host vehicle 11 according to the remaining distance Ds.

On the other hand, at step S8, the normal deceleration trajectory generating unit 88 generates a target speed, i.e. a normal medium-term stopping trajectory, from the remaining distance Ds and the vehicle speed Ve.

The vehicle control unit 110 then generates vehicle control values Cvh for controlling the output apparatus, based on the short-term trajectory St generated in step S4, step S7, or step S8, and outputs the vehicle control values to each component of the output apparatus (step S9). In this way, the vehicle control device 10 can implement the stopping control of the host vehicle 11 and stop the host vehicle 11 at the vehicle stop position Ps.

[Configuration for Changing the Deceleration Mode of the Short-Term Trajectory Generating Unit]

The short-term trajectory generating unit 73 shown in FIG. 2 is basically configured in the same manner as the medium-term trajectory generating unit 72, and generates the short-term trajectory St for a shorter distance (shorter time) than the medium-term trajectory Mt, by performing a similar process flow. As shown in FIG. 8, the short-term trajectory generating unit 73 includes a longitudinal-direction input mode setting unit 90, a longitudinal-direction pattern generating unit 91, a lateral-direction pattern generating unit 92, a trajectory candidate generating unit 93, a trajectory evaluating unit 94, an output trajectory generating unit 95, a past trajectory storage unit 96, and a target speed generating unit 97. The past trajectory storage unit 96 stores the short-term trajectories St calculated in the past (including at least the short-term trajectory St output by the most recent computation). Furthermore, in addition to the local environment map information Iem and the host vehicle state information Ivh, the long-term trajectory Lt and the medium-term trajectory Mt are also input to the short-term trajectory generating unit 73.

In the stopping control, a plurality of short-term stopping trajectories are generated by the longitudinal-direction pattern generating unit 91, to interpolate trajectories between the medium-term stopping trajectories described above or correct the medium-term stopping trajectories. The longitudinal-direction pattern generating unit 91 generates different trajectories according to several conditions set by the longitudinal-direction input mode setting unit 90. This configuration is described further below. On the other hand, a plurality of trajectory candidates (short-term stopping trajectories in the stopping control) are generated by the trajectory candidate generating unit 93, based on the longitudinal pattern of the longitudinal-direction pattern generating unit 91 and the lateral pattern of the lateral-direction pattern generating unit 92.

The target speed generating unit 97 is provided in the short-term trajectory generating unit 73 to generate velocity information for evaluating the trajectory candidates generated by the trajectory candidate generating unit 93. In other words, the short-term trajectory St is a trajectory that is directly reflected in the control of the host vehicle 11, and it is possible to accurately adjust the speed of the host vehicle 11 by evaluating and setting the short-term trajectory St based on the velocity information of the target speed generating unit 97.

In the same manner as the medium-term trajectory generating unit 72, the target speed generating unit 97 suitably generates the velocity information (preliminary deceleration amount or normal deceleration amount) for stopping the host vehicle 11 at the vehicle stop position Ps, according to the reliability Re during the stopping control. Therefore, a stopping trajectory generating unit 101 including a deceleration pattern determining unit 98, a preliminary deceleration generating unit 99, and a normal deceleration generating unit 100 is formed inside the target speed generating unit 97.

The deceleration pattern determining unit 98 of the target speed generating unit 97 determines the operations of the preliminary deceleration generating unit 99 and the normal deceleration generating unit 100, based on the reliability Re. The preliminary deceleration generating unit 99 calculates a preliminary deceleration amount such as shown in FIG. 5, based on the remaining distance Ds calculated by a remaining distance calculating unit 101a and the target speed table Tv stored in a target speed table storage unit 99a. On the other hand, the normal deceleration generating unit 100 generates a normal deceleration amount (a deceleration amount that changes in finer increments than the target speed set by the preliminary deceleration generating unit 99) for stopping the host vehicle 11 at the vehicle stop position Ps, based on the remaining distance Ds and the vehicle speed Ve. With the trajectory evaluating unit 94, when the stopping control is performed, one of the preliminary deceleration amount and the normal deceleration amount is input thereto, trajectory candidates matching the input deceleration amount are evaluated, and the short-term stopping trajectory (preliminary short-term stopping trajectory or normal short-term stopping trajectory) is set.

The short-term trajectory generating unit 73 is configured to perform a function different from that of the medium-term trajectory generating unit 72, and includes, when generating the longitudinal pattern, predicting the actual stop position from the host vehicle state information Ivh (basically the vehicle speed Ve) and changing the deceleration mode based on this prediction result. Therefore, the longitudinal-direction input mode setting unit 90 that selects one deceleration mode from among several deceleration modes is provided upstream from the longitudinal-direction pattern generating unit 91.

In the prediction of the actual stop position based on the state of the host vehicle 11, a prediction is made as to which of the first to third situations described below will occur.

First Situation: The host vehicle 11 passes the vehicle stop position Ps and then stops.

Second situation: The host vehicle 11 stops at a position a certain distance in front of the vehicle stop position Ps.

Third Situation: The host vehicle 11 stops in front of and near the vehicle stop position Ps.

Figure 9B:
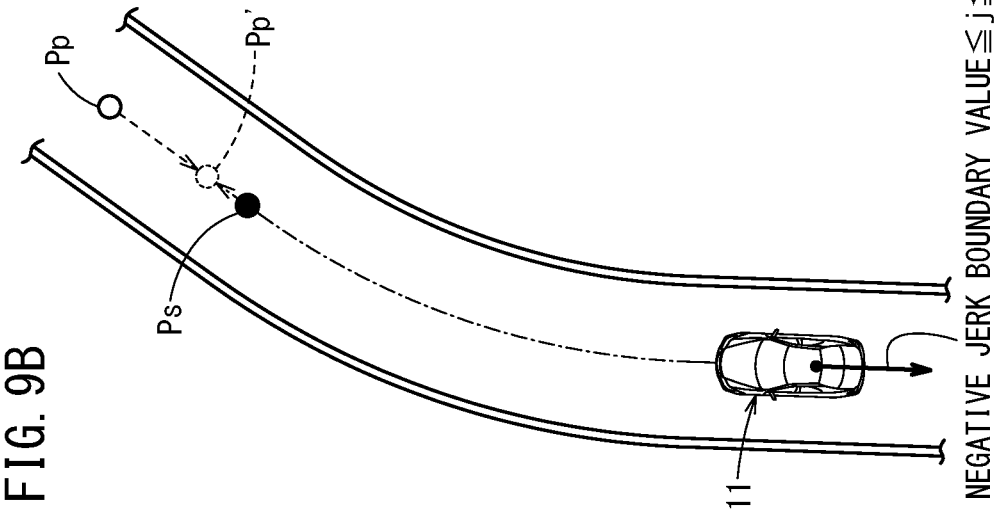
FIG. 9B is a planar view describing a state where the host vehicle decelerates according to a first deceleration mode.
Figure 9A:
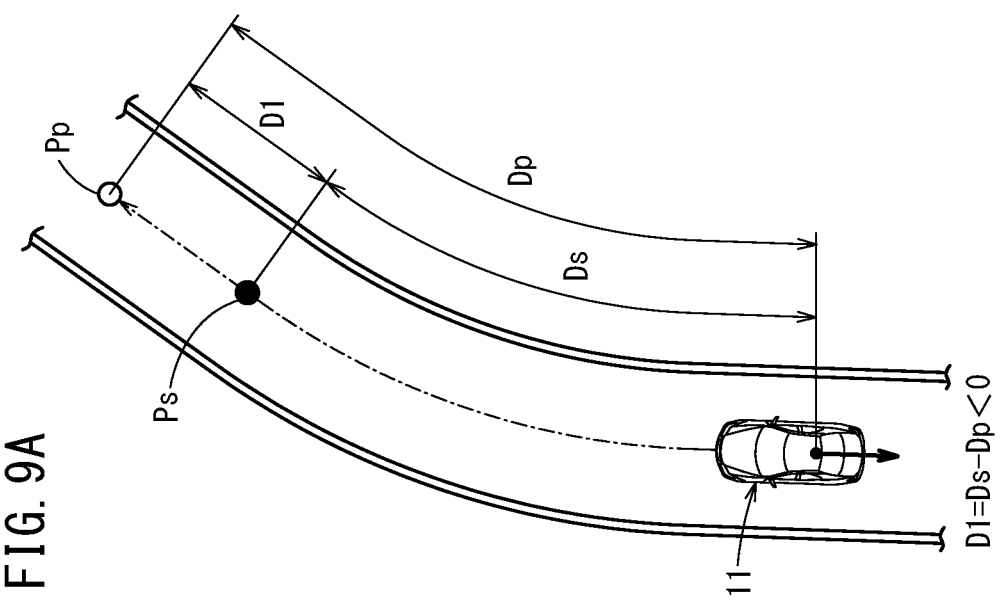
FIG. 9A is a planar view describing a first situation where the host vehicle stops beyond the vehicle stop position.

As shown in FIG. 9A, the first situation can be said to be a state in which the host vehicle 11 will stop at a predicted stop position Pp that is beyond the vehicle stop position Ps, even though the stopping trajectory is generated continuously as-is according to the current vehicle speed Ve to control the host vehicle 11. If the host vehicle 11 were to stop at this predicted stop position Pp, the host vehicle 11 would create problems such as interfering with the passage of traffic participants, increasing the possibility of colliding with a traffic participant, or the like.

Therefore, when the first situation is predicted, the short-term trajectory generating unit 73 sets the first deceleration mode and generates a short-term stopping trajectory that strengthens the degree of deceleration of the host vehicle 11, based on this first deceleration mode. Here, strengthening the degree of deceleration refers to increasing the change of the deceleration amount for the vehicle speed Ve, i.e. reducing the time rate of change in acceleration (jerk).

In this way, the short-term stopping trajectory shortens the intervals of the point sequence such that the vehicle speed Ve drops more quickly. As shown in FIG. 9B, when the change of the predicted stop position Pp is shown virtually, the predicted stop position Pp' is corrected to move backward to be close to the vehicle stop position Ps. The vehicle control unit 110 directly receives this corrected short-term stopping trajectory (target speed), and stops the host vehicle 11 at the vehicle stop position Ps by immediately reflecting this corrected short-term stopping trajectory in the braking control of the host vehicle 11.

Figure 10B:
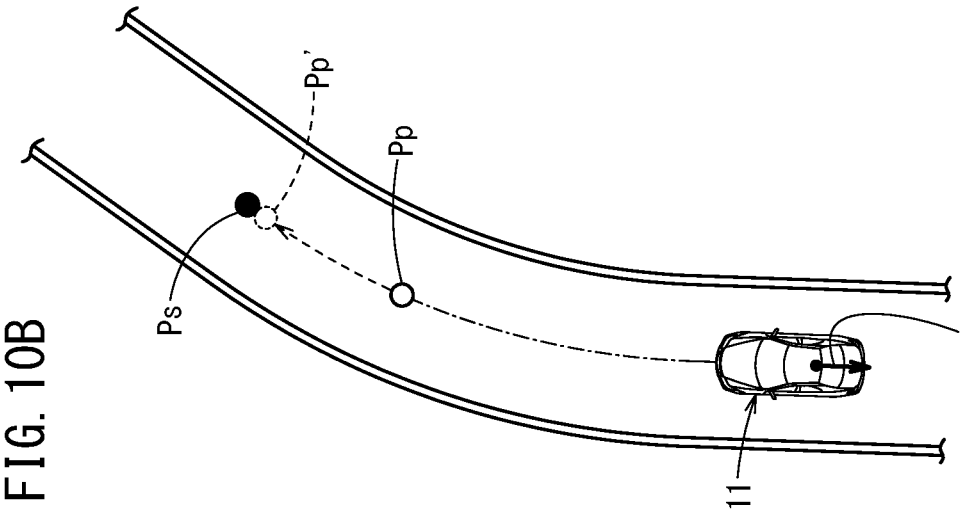
FIG. 10B is a planar view describing a state where the host vehicle decelerates according to a second deceleration mode.
Figure 10A:
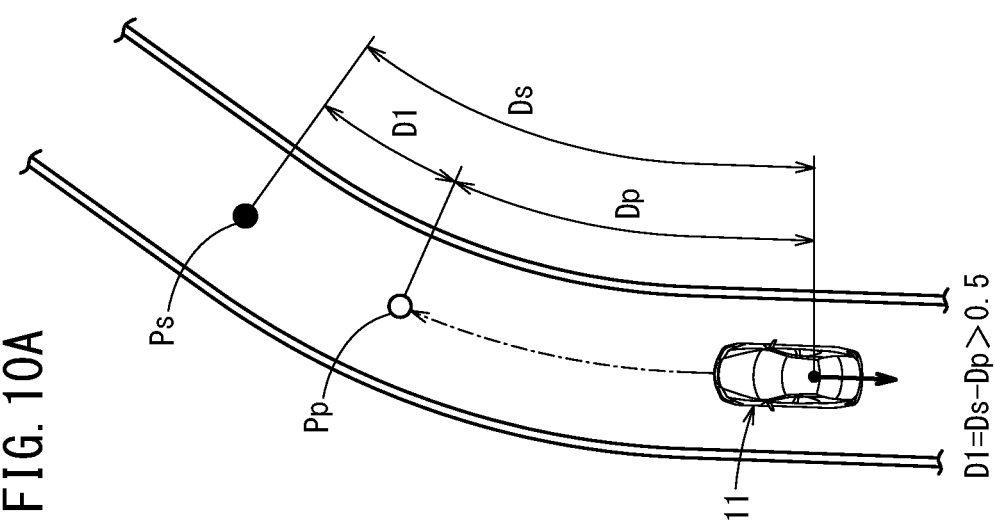
FIG. 10A is a planar view describing a second situation where the host vehicle stops a certain distance in front of the vehicle stop position.

As shown in FIG. 10A, the second situation can be said to be a state in which the host vehicle 11 will stop at a position a certain distance in front of the detected vehicle stop position Ps, even though the stopping trajectory is generated continuously as-is according to the current vehicle speed Ve to control the host vehicle 11. If the host vehicle 11 were to stop at this predicted stop position Pp, the host vehicle 11 would be at a position distanced from the stop line, and therefore this would affect the smooth flow of traffic in the entire route being travelled on.

Therefore, when the second situation is predicted, the short-term trajectory generating unit 73 sets the second deceleration mode and generates a short-term stopping trajectory that weakens the degree of deceleration of the host vehicle 11, based on this second deceleration mode. Here, weakening the degree of deceleration refers to decreasing the change of the deceleration amount for the vehicle speed Ve, i.e. increasing the time rate of change in acceleration (jerk). In this way, the short-term stopping trajectory is corrected to lengthen the intervals of the point sequence to gradually lower the vehicle speed Ve. Accordingly, as shown in FIG. 10B, when the change of the predicted stop position Pp is shown virtually, the predicted stop position Pp' is corrected to move forward to be close to the vehicle stop position Ps.

Figure 11B:
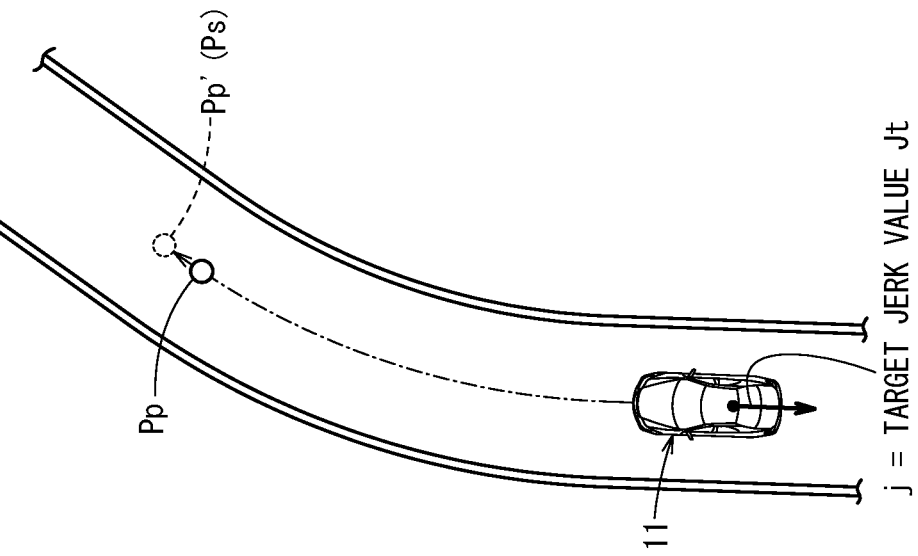
FIG. 11B is a planar view describing a state where the host vehicle decelerates according to a third deceleration mode.
Figure 11A:
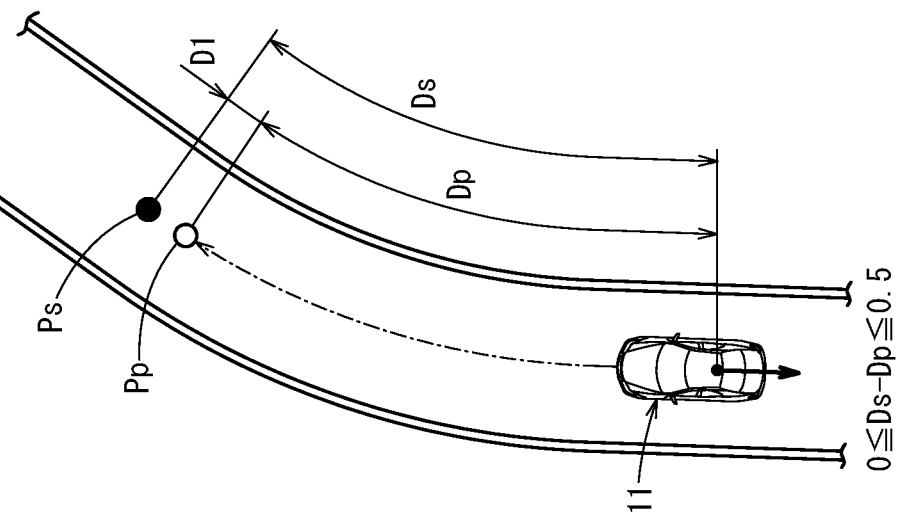
FIG. 11A is a planar view describing a third situation where the host vehicle stops near the vehicle stop position without passing beyond the vehicle stop position.

As shown in FIG. 11A, the third situation can be said to be a state in which, when the stopping trajectory is continuously generated as-is according to the current vehicle speed Ve to control the host vehicle 11, the host vehicle 11 stops near the vehicle stop position Ps without passing beyond the detected vehicle stop position Ps.

When this third situation is predicted, the short-term trajectory generating unit 73 sets the third deceleration mode and generates a short-term stopping trajectory that eliminates the deceleration amount of the host vehicle 11 at the vehicle stop position Ps, based on this third deceleration mode. Here, eliminating the deceleration amount at the vehicle stop position Ps refers to not changing the acceleration at the position where the host vehicle 11 stops, i.e. causing the time rate of change in acceleration (jerk) to converge at 0. In this way, the feeling of acceleration experienced by people riding in the host vehicle 11 when the host vehicle 11 stops is eliminated (or reduced). As shown in FIG. 11B, when the change of the predicted stop position Pp is shown virtually, the short-term stopping trajectory is corrected such that the vehicle velocity, the acceleration, and the jerk are all 0 at the vehicle stop position Ps.

Figure 12:
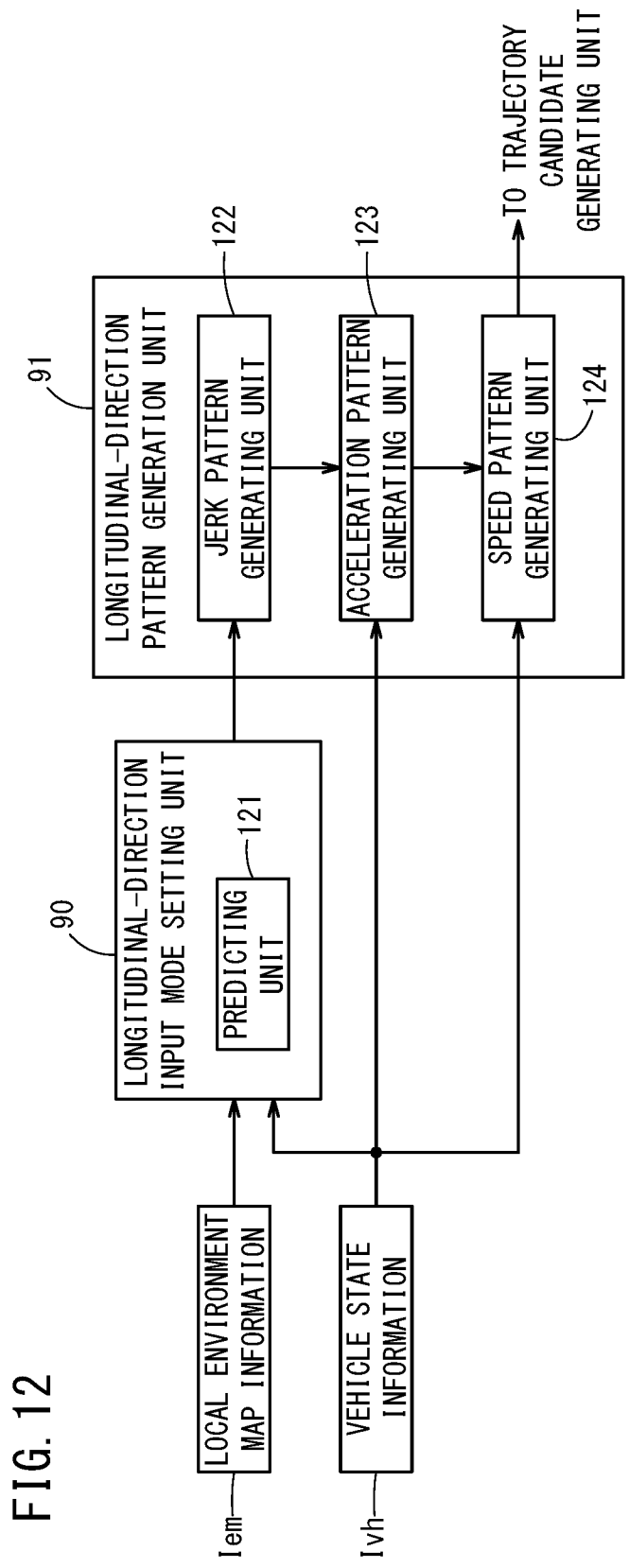
FIG. 12 is a block diagram showing a configuration of a longitudinal-direction input mode setting unit and a lateral-direction pattern generating unit.

In order to perform the control described above, as shown in FIG. 12, the longitudinal-direction input mode setting unit 90 of the short-term trajectory generating unit 73 includes a predicting unit 121 that predicts the position at which the host vehicle 11 will stop, relative to the vehicle stop position Ps, based on the host vehicle state information Ivh. Furthermore, the longitudinal-direction pattern generating unit 91 includes therein a jerk pattern generating unit 122, an acceleration pattern generating unit 123, and a speed pattern generating unit 124.

The predicting unit 121 calculates a predicted stopping distance Dp for the predicted stop position Pp where the host vehicle 11 is to stop according to the current short-term stopping trajectory, based on the host vehicle state information Ivh (vehicle velocity) and the external environment recognition information Ipr (current position of the host vehicle 11). Furthermore, the vehicle control system 12 calculates a relative distance D1 (see FIGS. 9A, 10A, and 11A) by subtracting the calculated predicted stopping distance Dp from the remaining distance Ds between the current position and the vehicle stop position Ps. The identification of one of the first to third situations described above is made based on this relative distance D1.

Specifically, if the relative distance D1<0 m, the first situation is identified in which the host vehicle 11 stops beyond the vehicle stop position Ps. If the relative distance D1>0.5 m (determination value), the second situation is identified in which the host vehicle 11 stop more than 0.5 m in front of the vehicle stop position Ps. If 0≤the relative distance D1≤0.5 m, the third situation is identified in which the host vehicle 11 stops near the vehicle stop position Ps without going beyond the vehicle stop position Ps. The longitudinal-direction input mode setting unit 90 then sets the first, second, or third deceleration mode according to the identification of the first to third situations by the predicting unit 121, and transmits the set deceleration mode to the jerk pattern generating unit 122 of the longitudinal-direction pattern generating unit 91.

The jerk pattern generating unit 122 outputs a jerk pattern (referred to below as a jerk value j) to the acceleration pattern generating unit 123, based on the input of one of the first to third deceleration modes. In the first deceleration mode, the jerk is set to be one or more jerk values j that are less than or equal to 0 and greater than or equal to a negative jerk boundary value. The negative jerk boundary value is set in advance in consideration of the vehicle dynamics (vehicle control values Cvh that stabilize the operation of the host vehicle 11), for example.

In the second deceleration mode, the jerk is set to be one or more jerk values j that are greater than or equal to a target jerk value Jt and less than or equal to a positive jerk boundary value. The target jerk value Jt is calculated according to Expression 1 below, based on an acceleration $a_0$ and the vehicle speed Ve included in the newest host vehicle state information Ivh, and the positive jerk boundary value is defined as a value the takes into consideration the vehicle dynamics, in the same manner as the negative jerk boundary value.

$$Jt=\text{acceleration } a_0^2/2Ve \qquad \text{Expression 1:}$$

The third deceleration mode is a mode for adjusting the jerk value j such that the velocity, acceleration, and jerk converge at 0 at the vehicle stop position Ps. In this case, it is already estimated that the host vehicle 11 will stop within 0.5 m of the vehicle stop position Ps without passing the vehicle stop position Ps, and therefore in the third deceleration mode, one or more jerk values j substantially matching the target jerk value Jt are set, and the normal short-term stopping trajectory is only corrected by a small amount. In this way, it is possible to generate a trajectory for a full stop within 0.5 m of the vehicle stop position Ps without causing a feeling of acceleration.

The acceleration pattern generating unit 123 of the longitudinal-direction pattern generating unit 91 generates the acceleration pattern based on the host vehicle state information Ivh and the jerk value j input from the jerk pattern generating unit 122. The acceleration pattern is generated simply by integrating the jerk value j, and the host vehicle state information Ivh is used to calculate an integration constant, for example.

The speed pattern generating unit 124 of the longitudinal-direction pattern generating unit 91 generates the velocity pattern based on the host vehicle state information Ivh and the acceleration pattern input from the acceleration pattern generating unit 123. The velocity pattern is generated simply by integrating the acceleration pattern, and the host vehicle state information Ivh is used to calculate an integration constant, for example. The speed pattern generating unit 124 outputs the calculated velocity pattern (longitudinal pattern) to the trajectory candidate generating unit 93.

[Process Flow for Changing the Deceleration Mode]

Figure 13:
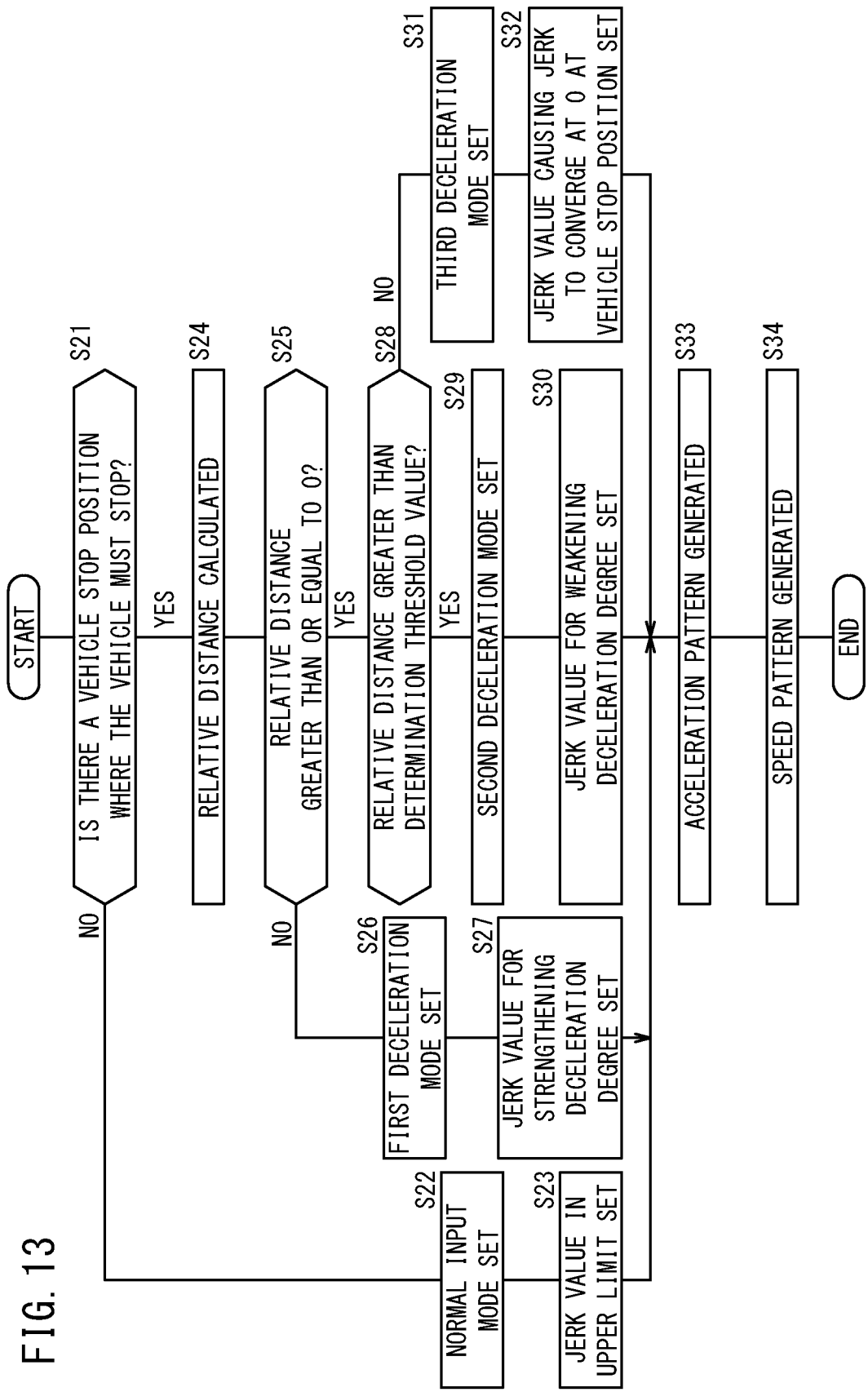
FIG. 13 is a flow chart showing a process flow of a normal deceleration trajectory generating unit of the short-term trajectory generating unit.

The following describes the process flow of the short-term trajectory generating unit 73 described above, with reference to FIG. 13. The short-term trajectory generating unit 73 suitably changes the deceleration content for generating the normal short-term stopping trajectory, when the host vehicle 11 becomes within a certain distance of the vehicle stop position Ps, and performs control to stably and comfortably stop the host vehicle 11 at the vehicle stop position Ps. Specifically, the short-term trajectory generating unit 73 determines whether there is a vehicle stop position Ps (stop line, traffic signal, or the like) at which the vehicle must stop on the travel path, based on the information of the local environment map information Iem (step S21).

If a vehicle stop position Ps is not detected at step S21, the longitudinal-direction input mode setting unit 90 sets a normal input mode causing the host vehicle 11 to travel normally (travel that does not include the stop control) (step S22). Based on the setting of this normal input mode, the jerk pattern generating unit 122 of the longitudinal-direction pattern generating unit 91 sets the jerk value within the upper limit of the host vehicle 11 (step S23). The jerk value within the upper limit is a jerk value that adjusts the velocity of the host vehicle 11 within a range that does not cause the acceleration of the host vehicle 11 to increase or decrease suddenly.

On the other hand, if a vehicle stop position Ps is detected at step S21, the longitudinal-direction input mode setting unit 90 (predicting unit 121) calculates the predicted stopping distance Dp based on the vehicle speed Ve and calculates the relative distance D1 by subtracting the predicted stopping distance Dp from the remaining distance Ds (step S24).

The longitudinal-direction input mode setting unit 90 then determines whether the calculated relative distance D1 is greater than or equal to 0 (step S25), and sets the first deceleration mode if the relative distance D1 is less than 0 (step S26). When the first deceleration mode is set at step S26, the jerk pattern generating unit 122 sets the jerk value j to be less than or equal to 0 and greater than or equal to the negative jerk boundary value, to strengthen the degree of the deceleration of the host vehicle 11 (step S27).

On the other hand, if the relative distance D1 is positive at step S25, a determination is made as to whether the relative distance D1 is larger than the determination threshold value (0.5 m in the present embodiment) (step S28). If the relative distance D1 is greater than the determination threshold value, the second deceleration mode is set (step S29), and if the relative distance D1 is less than or equal to the determination threshold value, the third deceleration mode is set (step S31).

When the second deceleration mode is set at step S29, the jerk pattern generating unit 122 sets the jerk value j to be greater than or equal to the target jerk value Jt and less than or equal to the positive jerk boundary value (step S30). When the third deceleration mode is set at step S31, the jerk pattern generating unit 122 sets one or more jerk values j that substantially match the target jerk value Jt (step S32)

The jerk values j set at steps S23, S27, S30, and S32 are output to the acceleration pattern generating unit 123, and the acceleration pattern is generated by the acceleration pattern generating unit 123 (step S33). The acceleration pattern generated by the acceleration pattern generating unit 123 is output to the speed pattern generating unit 124, and the velocity pattern is generated by the speed pattern generating unit 124 (step S34). This velocity pattern is the output to the trajectory candidate generating unit 93 as the longitudinal pattern.

In this way, the short-term trajectory generating unit 73 can output a short-term stopping trajectory that enables the host vehicle 11 to more stably stop at the vehicle stop position Ps. The vehicle control unit 110 generates the vehicle control values CVh based on this short-term stopping trajectory to drive each output apparatus. For example, if the third deceleration mode is set by the longitudinal-direction input mode setting unit 90, it is possible to stop the host vehicle 11 at the vehicle stop position Ps without the vehicle occupants feeling acceleration.

In the manner described above, in the vehicle control device 10 according to the present embodiment, the stopping trajectory is set according to the remaining distance Ds using the target speed table Tv, by the preliminary deceleration trajectory generating unit 87 of the stopping trajectory generating unit 89 or the preliminary deceleration generating unit 99 of the stopping trajectory generating unit 101. In this way, when the stopping control is performed, it is possible to decelerate the host vehicle 11 to follow a target speed corresponding to the remaining distance Ds, regardless of the detection state of the vehicle stop position Ps. Accordingly, at the point where the vehicle stop position Ps is accurately detected, the velocity of the host vehicle 11 has already decreased sufficiently, and the vehicle control device 10 can stop the host vehicle 11 at the vehicle stop position Ps stably and comfortably.

In this case, when the external environment recognition result Ip is unreliable, the medium-term trajectory generating unit 72 and the short-term trajectory generating unit 73 generate the preliminary medium-term stopping trajectory and the preliminary deceleration amount according to the remaining distance Ds using the preliminary deceleration trajectory generating unit 87 and the preliminary deceleration generating unit 99. Thus, the vehicle control device 10 can preliminarily decelerate the host vehicle 11. Then, the vehicle control device 10 can provide suitable reliability Re based on the type of the external environment sensors 14, the navigation apparatus 16, the communication apparatus 20, and the like. Accordingly, it is possible to favorably select operation of the preliminary deceleration trajectory generating unit 87 and the normal deceleration trajectory generating unit 88 or operation of the preliminary deceleration generating unit 99 and the normal deceleration generating unit 100, based on the reliability Re. Furthermore, the vehicle control device 10 can provide suitable reliability Re from the external environment recognition information Ipr, based on the factors of the apparatus state, the external environment conditions, and the road state as well.

The medium-term trajectory generating unit 72 and the short-term trajectory generating unit 73 can easily set the stopping trajectory according to the remaining distance Ds, by referencing the target speed table Tv stored in the storage apparatus 40. Furthermore, by setting the target speed in a stepped manner according to the remaining distance Ds in the target speed table Tv, it is possible to set the target speed to have a tolerance for containing errors, even when there is an error in the vehicle stop position Ps. Yet further, the vehicle control device 10 can more smoothly decelerate the host vehicle 11 by uniformly lowering the target speed in the target speed table Tv as the remaining distance Ds becomes shorter in each prescribed range.

The vehicle control device 10 according to the present embodiment corrects the short-term stopping trajectory in a manner to strengthen the degree of deceleration of the host vehicle 11 when the short-term trajectory generating unit 73 predicts that the predicted stop position Pp is beyond the vehicle stop position Ps. In this way, it is possible to decelerate the host vehicle 11 such that the host vehicle 11 becomes closer to the vehicle stop position Ps. On the other hand, when the predicted stop position Pp is predicted to be in front of the vehicle stop position Ps, the vehicle control device 10 can decelerate the host vehicle 11 such that the host vehicle 11 becomes closer to the vehicle stop position Ps by correcting the short-term stopping trajectory in a manner to weaken the degree of deceleration of the host vehicle 11.

In this case, the longitudinal-direction pattern generating unit 91 sets the jerk value j (rate of change of the deceleration amount) of the host vehicle 11 by generating (correcting) the short-term stopping trajectory, thereby easily generating the short-term stopping trajectory by repeating the integration of the jerk value j. Furthermore, when the relative distance D1 is less than or equal to the determination threshold value, the target speed is corrected such that the deceleration amount of the host vehicle 11 is 0 at the vehicle stop position Ps, thereby preventing the host vehicle 11 from accelerating at the vehicle stop position Ps. Accordingly, it is possible to improve the comfort of the vehicle occupants and reduce the feeling of being pressured (accelerating), and also to prevent problems such as the host vehicle 11 moving at the vehicle stop position Ps and shifting from the actual stop position.

In other words, by changing the deceleration mode of the host vehicle 11 according to the first to third situations, the vehicle control device 10 can improve the comfort of the vehicle occupants. Furthermore, it is possible to completely stop the host vehicle 11 at the vehicle stop position Ps with greater accuracy, and to reduce the errors and the like of the detection of the vehicle stop position Ps as much as possible.

The vehicle control device 10 according to the present embodiment is not limited to the configuration described above, and can adopt various applications and modifications. For example, the vehicle control device 10 may be configured to select whether or not to apply the correction or to apply different correction amounts, according to the type of the vehicle stop position Ps included in the local environment map information Iem when generating the short-term stopping trajectory of the short-term trajectory generating unit 73 (longitudinal-direction pattern generating unit 91).

For example, as shown in FIG. 14A, a signal stop line together with a traffic light, a temporary stop line, a vehicle in front (a preceding vehicle), or the like are examples of target objects for the vehicle stop position Ps. In this case, the local environment map generating unit 54 outputs the local environment map information Iem, including information concerning the signal stop line, the temporary stop line, and the vehicle in front, to the short-term trajectory generating unit 73 via the integrated control unit 70.

On the other hand, the longitudinal-direction input mode setting unit 90 of the short-term trajectory generating unit 73 determines whether to implement the deceleration mode change (implement the correction) based on the information of a stop target object included in the local environment map information Iem. For example, if the vehicle stop position Ps is a signal stop line or a temporary stop line, it is possible to favorably stop the host vehicle 11 at the signal stop line or temporary signal line by selecting one of the first to third deceleration modes (implementing the correction).

As another example, it is possible to easily perform travel corresponding to the vehicle in front, by not performing the correction when the vehicle stop position Ps is the vehicle in front. As yet another example, by reducing the correction amount more for a temporary stop line than for a signal stop line, it is possible for the host vehicle 11 to proceed smoothly from the temporary stop line after stopping. In the manner described above, by selecting whether or not to apply the correction or to apply different correction amounts to the target speed based on information concerning a signal stop line, a temporary stop line, and a vehicle in front, it is possible to more suitably perform the stopping control of the host vehicle 11 according to traffic conditions.

Alternatively, the vehicle control device 10 may be configured to select whether or not to implement the correction based on the reliability Re of the local environment map information Iem, as shown in FIG. 14B, when generating the short-term stopping trajectory of the short-term trajectory generating unit 73 (longitudinal-direction pattern generating unit 91). In other words, by not performing the correction when the reliability Re is low (when the reliability flag is 0), it is possible to prevent the host vehicle 11 from stopping at a vehicle stop position Ps that is estimated to be an error.

Furthermore, by selecting one of the first to third deceleration modes (implementing the correction) when the reliability Re is high (when the reliability flag is 1), it is possible to accurately stop the host vehicle 11 at the vehicle stop position Ps.

The present invention is not limited to the embodiments described above, and it is obvious that various modifications can be made thereto without deviating from the scope of the present invention. For example, the vehicle control device 10 can also be applied in a case of performing driving assistance for only velocity control, or a case of performing driving assistance of providing a driver that performs manual driving with guidance concerning a target speed or target steering position from a monitor, speaker, or the like that is an onboard apparatus. As an example, in driving assistance for providing guidance concerning a target speed, the driver can be suitably encouraged to decelerate by displaying deceleration to a target speed every remaining distance Ds to the vehicle stop position Ps.

The invention claimed is:

1. A vehicle control device comprising:
   a vehicle speed sensor that detects a vehicle speed of a host vehicle;
   a vehicle stop position detecting unit that detects a vehicle stop position in front of and in a traveling direction of the host vehicle;
   one or more processors, wherein the one or more processors are configured to:
      calculate a remaining distance from the host vehicle to the detected stop position;
      determine a reliability of the vehicle stop position or information concerning the calculated remaining distance; and
      set repeatedly, using a predetermined setting method, a target speed of the host vehicle such that the host vehicle decelerates according to the calculated remaining distance,
   wherein:
      in the case that the reliability is less than a reliability threshold, the host vehicle decelerates such that the target speed changes in increments of a first length, and
      in the case that the reliability is greater than the reliability threshold, the host vehicle decelerates such that the target speed changes in increments of a second length, wherein the second length is smaller than the first length.

2. The vehicle control device according to claim 1, wherein the one or more processors prompt deceleration of the host vehicle by outputting the target speed when the vehicle speed is higher than the target speed, and does not prompt acceleration of the host vehicle when the vehicle speed is lower than or equal to the target speed.

3. The vehicle control device according to claim 1, wherein the one or more processors determine whether the information is reliable based on a reliability quantified as information concerning the vehicle stop position or the remaining distance, and the reliability is set for each of a plurality of types of apparatuses forming the vehicle stop position detecting unit.

4. The vehicle control device according to claim 1, wherein the one or more processors determine whether the information is reliable based on a reliability quantified as information concerning the vehicle stop position or the remaining distance, and the reliability is set according to factors of the host vehicle itself or factors outside the host vehicle that affect the reliability by processing detection information detected by the vehicle stop position detecting unit.

5. The vehicle control device according to claim 1, comprising a storage unit configured to store a target speed table in which the target speed decreases in a stepped manner as the remaining distance becomes shorter, wherein the one or more processors reference the target speed table and set the target speed corresponding to the remaining distance, as the predetermined setting method.

6. The vehicle control device according to claim 5, wherein the target speed table divides the remaining distance into a plurality of predetermined ranges, and the target speed decreases uniformly as the remaining distance in each predetermined range becomes shorter.

* * * * *